US012308587B2

(12) United States Patent
Nowalis et al.

(10) Patent No.: US 12,308,587 B2
(45) Date of Patent: May 20, 2025

(54) POWER ADAPTER

(71) Applicant: MILWAUKEE ELECTRIC TOOL CORPORATION, Brookfield, WI (US)

(72) Inventors: Dean Nowalis, Franklin, WI (US); David M. Schwalbach, Milwaukee, WI (US); Paul Rossetto, Milwaukee, WI (US); Brian Alves, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 120 days.

(21) Appl. No.: 18/190,379

(22) Filed: Mar. 27, 2023

(65) Prior Publication Data

US 2023/0238758 A1 Jul. 27, 2023

Related U.S. Application Data

(62) Division of application No. 16/386,452, filed on Apr. 17, 2019, now Pat. No. 11,616,331.

(60) Provisional application No. 62/660,337, filed on Apr. 20, 2018.

(51) Int. Cl.
*H01R 31/06* (2006.01)
*H01R 27/02* (2006.01)

(52) U.S. Cl.
CPC ........... *H01R 31/065* (2013.01); *H01R 27/02* (2013.01)

(58) Field of Classification Search
CPC .... H01R 31/065; H01R 27/02; H01R 13/447; H01R 13/72; H01R 24/68; B25F 5/02; B25F 1/00; B25F 5/00; H02J 7/0044; H02J 7/0045; H02J 7/0068; H02J 7/0003; H01M 2250/00
See application file for complete search history.

(56) References Cited

U.S. PATENT DOCUMENTS

| | | | |
|---|---|---|---|
| 6,104,162 | A | 8/2000 | Sainsbury et al. |
| 6,243,276 | B1 | 6/2001 | Neumann |
| 7,015,675 | B1 | 3/2006 | Andre |
| 10,727,731 | B1 | 7/2020 | King |
| 2002/0061678 | A1 | 5/2002 | Archambault |

(Continued)

FOREIGN PATENT DOCUMENTS

| | | | | |
|---|---|---|---|---|
| FR | 2623345 | A1 | 5/1989 | |
| JP | 2005278375 | A * | 10/2005 | |
| JP | 2016018602 | A * | 2/2016 | ........ H01M 10/4257 |

OTHER PUBLICATIONS

JP-2016018602-A (Translation) (Year: 2024).*

(Continued)

*Primary Examiner* — Hoa C Nguyen
*Assistant Examiner* — John B Freal
(74) *Attorney, Agent, or Firm* — Michael Best & Friedrich LLP

(57) ABSTRACT

An adapter assembly including a power box that has a housing containing internal components, a longitudinal axis and a storage portion. The adapter assembly also includes a first cord coupled to and extending from the housing, an adapter including an engagement portion that is removably coupled to the storage portion of the housing and that selectively engages a power source-receiving portion of a tool, and a second cord having a first end coupled to the adapter and a second end coupled to the housing.

18 Claims, 31 Drawing Sheets

(56) References Cited

U.S. PATENT DOCUMENTS

| | | | | |
|---|---|---|---|---|
| 2002/0149345 | A1* | 10/2002 | Takano | H02J 7/0068 320/137 |
| 2003/0090239 | A1 | 5/2003 | Sakakibara | |
| 2003/0190877 | A1* | 10/2003 | Gallagher | B24B 55/00 451/344 |
| 2004/0070369 | A1 | 4/2004 | Sakakibara | |
| 2005/0015995 | A1 | 1/2005 | Melton et al. | |
| 2005/0082920 | A1 | 4/2005 | Heigl et al. | |
| 2007/0039912 | A1* | 2/2007 | Hinkens | B65H 75/06 211/71.01 |
| 2009/0108828 | A1 | 4/2009 | Edamula | |
| 2010/0221591 | A1 | 9/2010 | Roßkamp et al. | |
| 2014/0053412 | A1 | 2/2014 | Carlucci et al. | |
| 2015/0137789 | A1 | 5/2015 | Furtner | |
| 2015/0143150 | A1 | 5/2015 | Verdun | |
| 2017/0063073 | A1 | 3/2017 | Friedman et al. | |
| 2018/0278196 | A1 | 9/2018 | White et al. | |

OTHER PUBLICATIONS

JP-2005278375-A (Translation) (Year: 2024).*
International Search Report and Written Opinion for Application No. PCT/US2019/027800 dated Aug. 9, 2019 (10 pages).

* cited by examiner

POWER ADAPTER

CROSS-REFERENCE TO RELATED APPLICATIONS

This application is a division of U.S. patent application Ser. No. 16/386,452, filed Apr. 17, 2019, and claims priority to U.S. Provisional Patent Application No. 62/660,337, filed Apr. 20, 2018, the entire content of each of which is hereby incorporated by reference.

FIELD OF INVENTION

The invention generally relates to battery-powered electrical devices, such as tools, and, more particularly, to a power adapter for an electrical device.

BACKGROUND OF THE INVENTION

Tools, such as power tools (e.g., drills, drivers, saws, nailers, grinders, etc.), outdoor tools (e.g., trimmers, pole saws, blowers, etc.), etc., and other electrical devices (e.g., motorized devices, non-motorized devices, chargers, etc.) (generally referred to herein as "devices" or a "device") may transfer power (e.g., be powered by, supply power to) with rechargeable battery packs. The battery pack may be detached from a device for charging or for use with other devices. In many cases, battery packs are designed such that the same battery pack may be used with many kinds of devices.

SUMMARY

In one construction, an adapter assembly includes a power box that has a housing containing internal components, a longitudinal axis and a storage portion. The adapter assembly also includes a first cord coupled to and extending from the housing, an adapter including an engagement portion that is removably coupled to the storage portion of the housing and that selectively engages a power source-receiving portion of a tool, and a second cord having a first end coupled to the adapter and a second end coupled to the housing.

In another construction, a power box for use with an adapter assembly includes a housing containing internal components and is configured to receive an alternating current and to output a direct current and a foot projecting from the housing and having a first height wherein the housing is spaced apart from a support surface by the first height.

Other independent aspects of the invention may become apparent by consideration of the detailed description and accompanying drawings.

Before any independent constructions of the invention are explained in detail, it is to be understood that the invention is not limited in its application to the details of construction and the arrangement of components set forth in the following description or illustrated in the following drawings. The invention is capable of other independent constructions and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

DETAILED DESCRIPTION

Figure 1A:
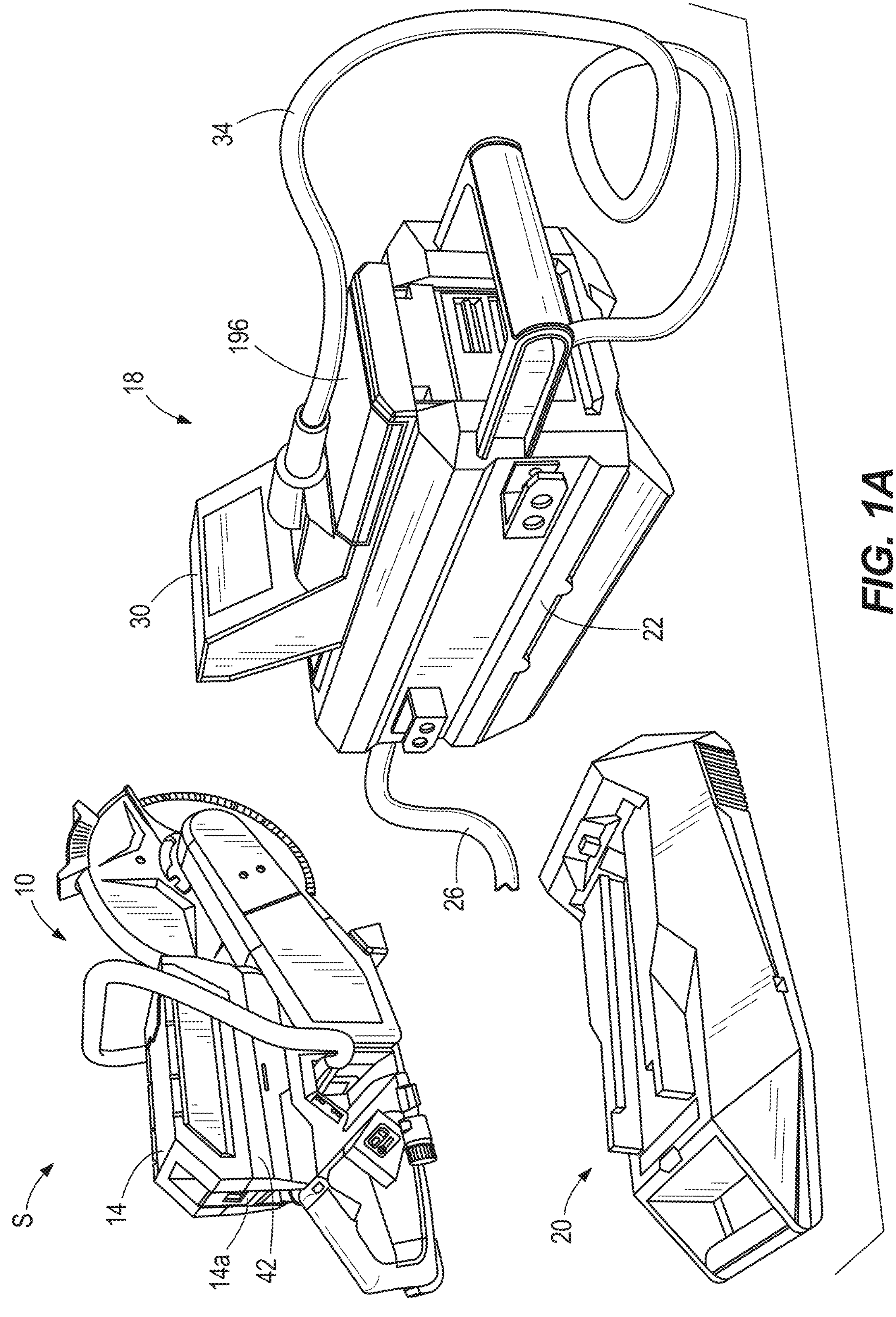
FIG. 1A is a perspective view of a system including a battery pack, a battery charger, a power adapter assembly, and an electrical device, such as a power tool, an outdoor tool, other electrical device, etc.

FIG. 1A illustrates a system S including an electrical device (e.g., a power tool 10 (e.g., a drill, a driver, a saw, a nailer, a grinder, etc.), an outdoor tool (e.g., a trimmer, a pole saw, etc.), etc., and another electrical device (e.g., a motorized device, a non-motorized device, etc.) selectively powered by a removable and rechargeable battery pack 14 or an adapter assembly 18, and a battery charger 20 operable to charge the battery pack 14.

The illustrated adapter assembly 18 is an AC/DC adapter assembly 18 including a power box 22 operable to receive as input alternating current (AC) power via a power cord 26 and supply direct current (DC) power via an adapter 30 to the tool 10. An adapter cord 34 electrically connects the adapter 30 to the power box 22. In other constructions (not shown), the adapter assembly 18 may receive power from another power source (e.g., a DC power source (a battery pack), a generator, etc.).

The illustrated tool 10 includes a saw. The tool 10 includes a power source support portion 42 that receives and electrically connects either a pack engagement portion 14*a* of the battery pack 14 or the adapter 30 to the tool 10. In other words, the pack engagement portion 14*a* may be mechanically (and electrically) connectable to the power source support portion 42 to connect the battery pack 14 to the device 10. Alternatively, as discussed in greater detail below, the adapter 30 may be mechanically (and electrically) connectable to the power source support portion 42 to connect the adapter 30 to the device 10.

Figure 2:
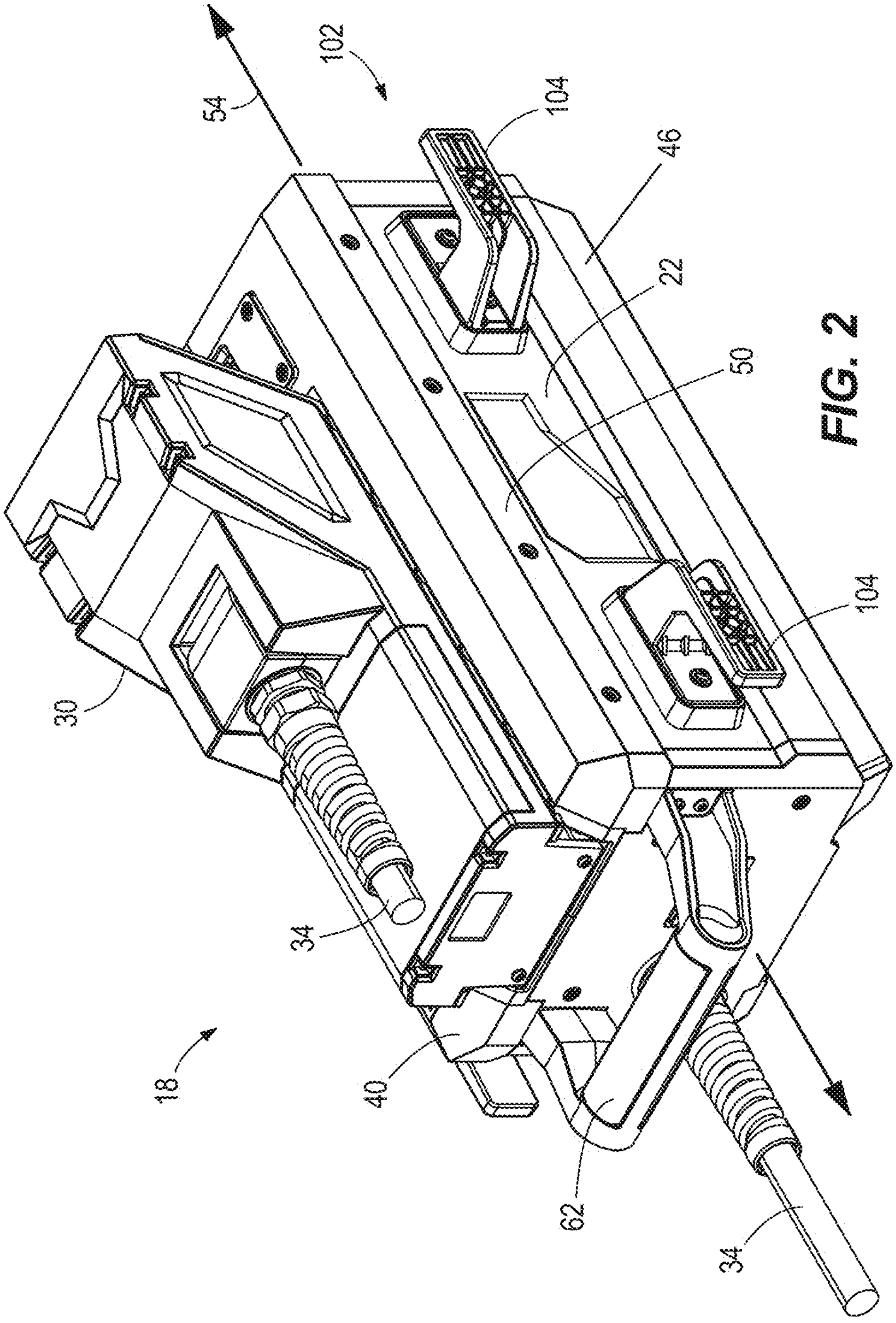
FIG. 2 is a perspective view of the adapter assembly of FIG. 1A.
Figure 3:
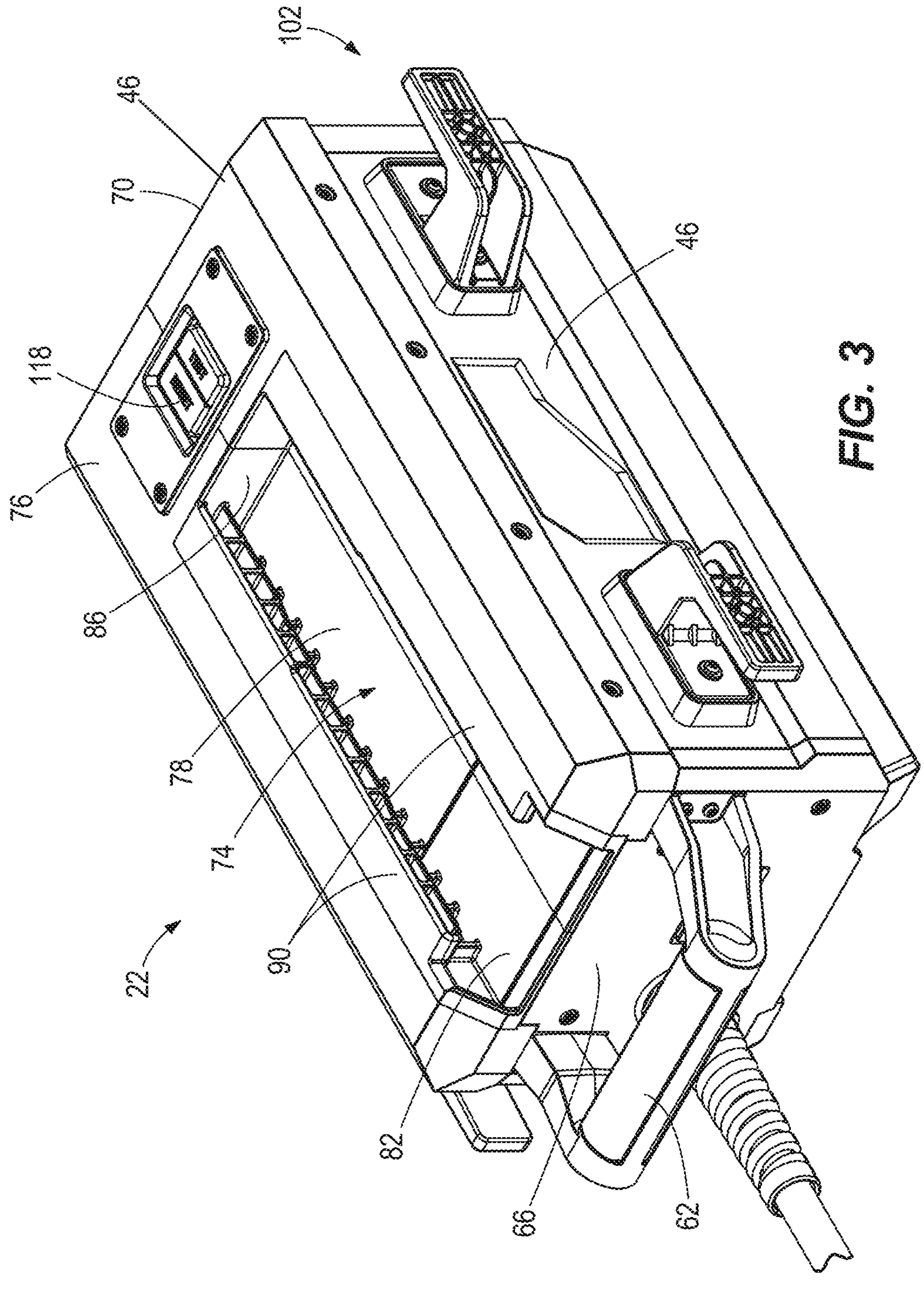
FIG. 3 is a perspective view of a power box of the adapter assembly of FIG. 2
Figure 4:
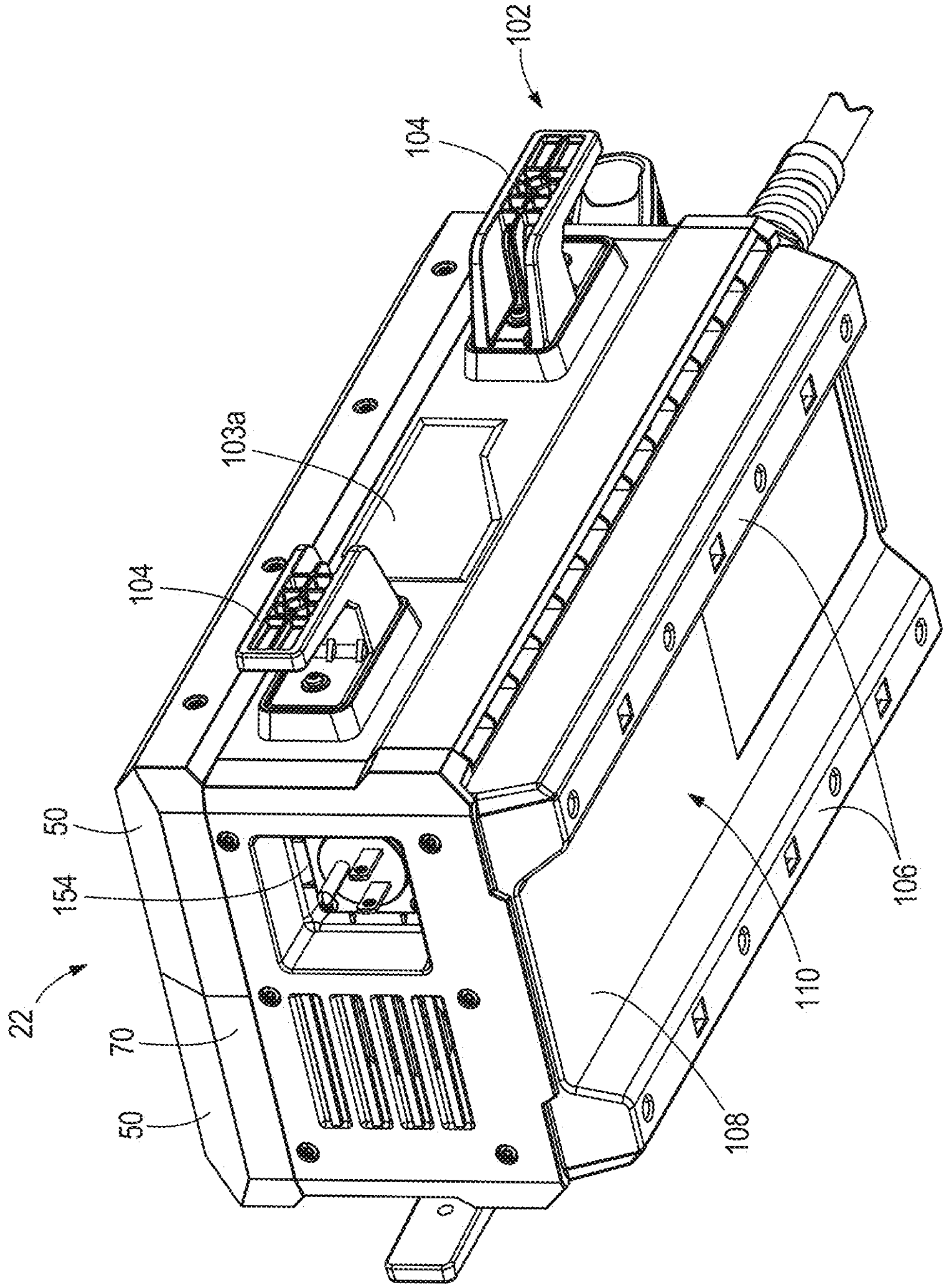
FIG. 4 is another perspective view of the power box of FIG. 3.

With reference to FIGS. 2-14, the power box 22 includes a housing 46 formed, in the illustrated construction, of two clamshell housing halves 50 connected along plane 54 (FIG. 2). In the illustrated construction, the housing halves 50 are connected with threaded fasteners (e.g., screws) or other suitable coupling means. Together, the housing halves 50 define an internal compartment C (FIG. 14) within the housing 46 containing internal components 58 of the power box 22.

The housing 46 includes a handle 62 formed at a first end 66 opposite a second end 70 and a storage portion 74 operable to selectively receive the adapter 30 for convenient storage when the adapter assembly 18 is not in use. In additional or alternative embodiments, the storage portion 74 may be configured to receive the pack engagement portion 14*a* to selectively couple the battery pack 14 to the power box 18. The storage portion 74 is formed in a first or top side 76 of the power box 22. The storage portion 74 includes a recessed cavity 78 open at an open end 82 proximate the first end 66 and adjacent the handle 62, and closed at a closed end 86.

Figure 15:
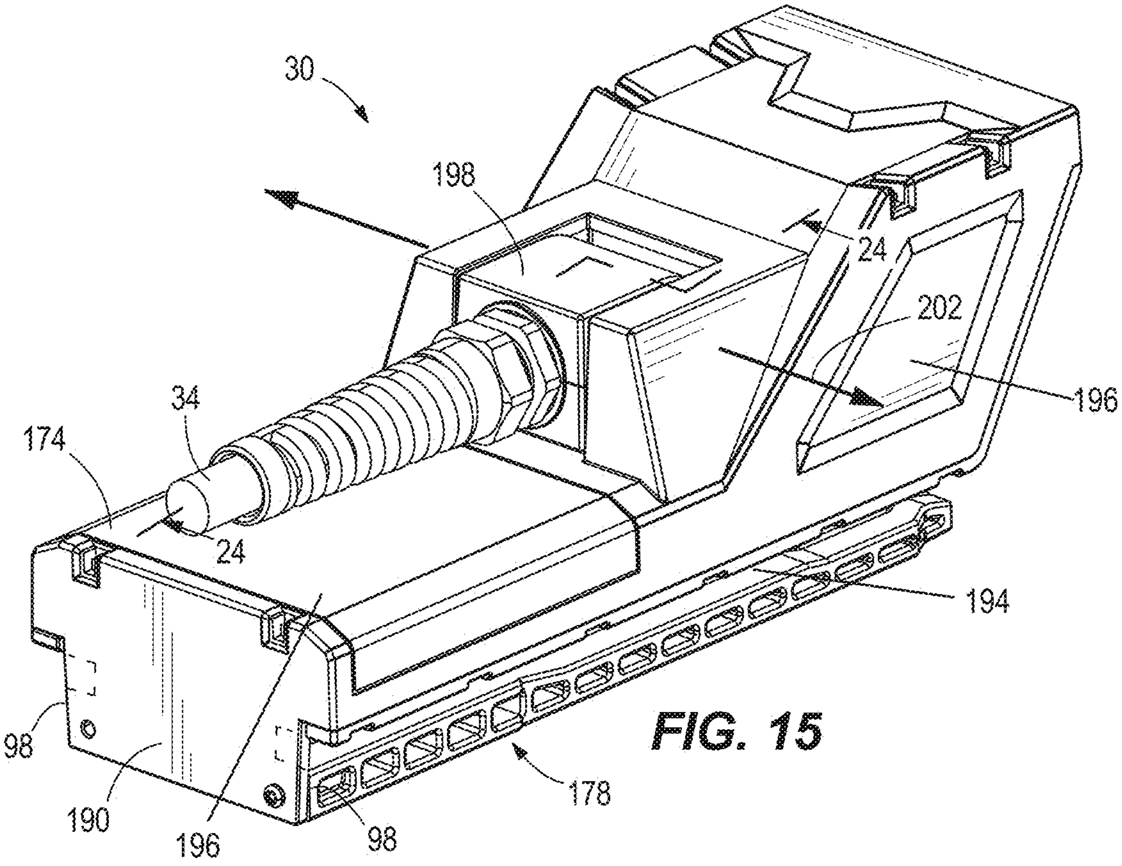
FIG. 15 is a perspective view of an adapter of the adapter assembly of FIG. 2.
Figure 16:
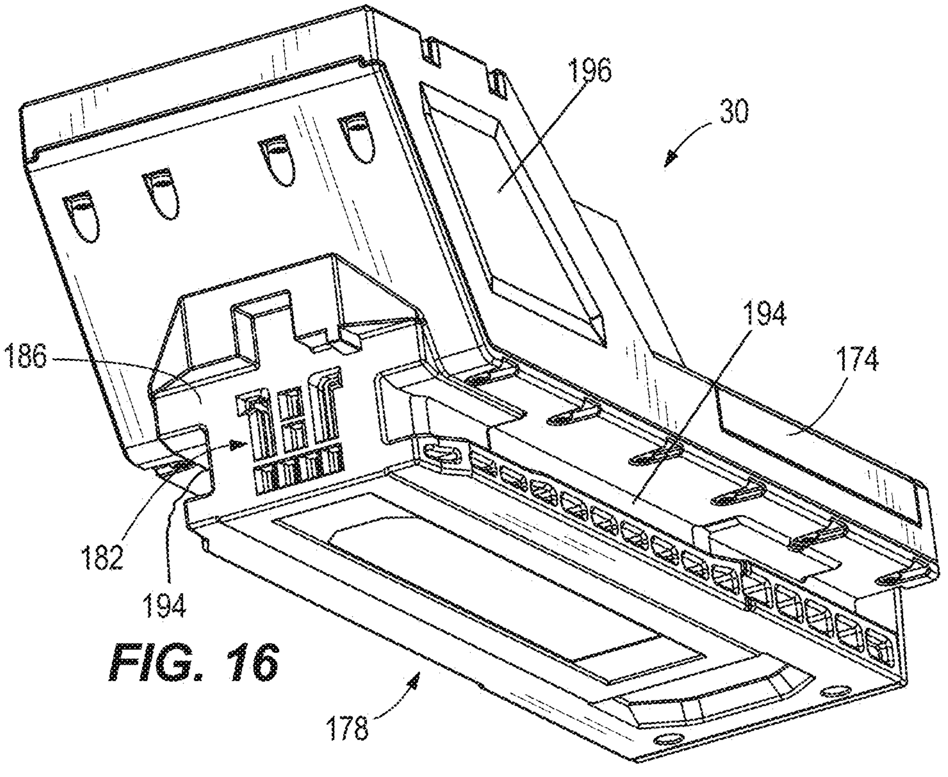
FIG. 16 is another perspective view of the adapter of FIG. 15.
Figure 17:
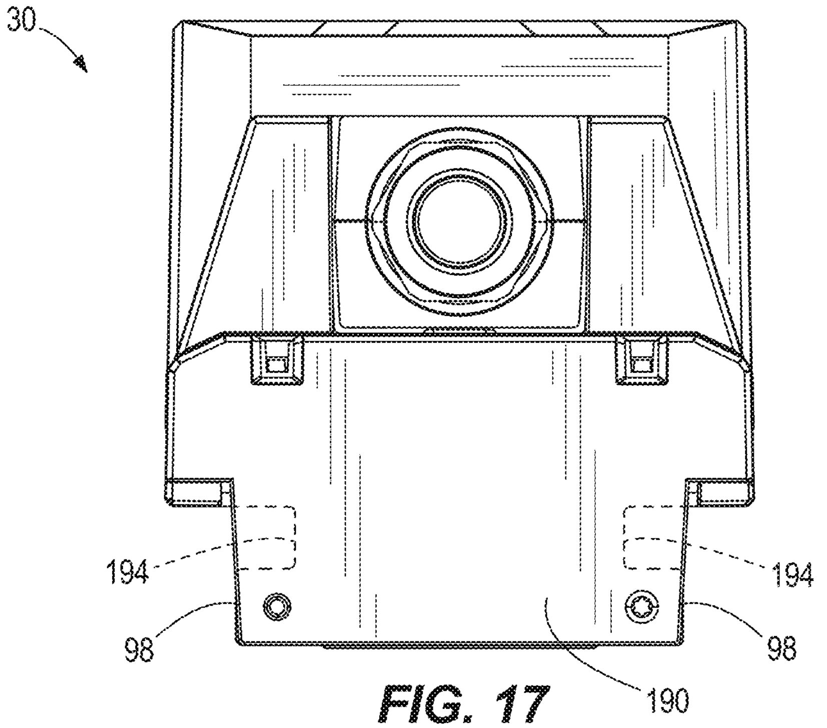
FIG. 17 is an end view of the adapter of FIG. 15.
Figure 18:
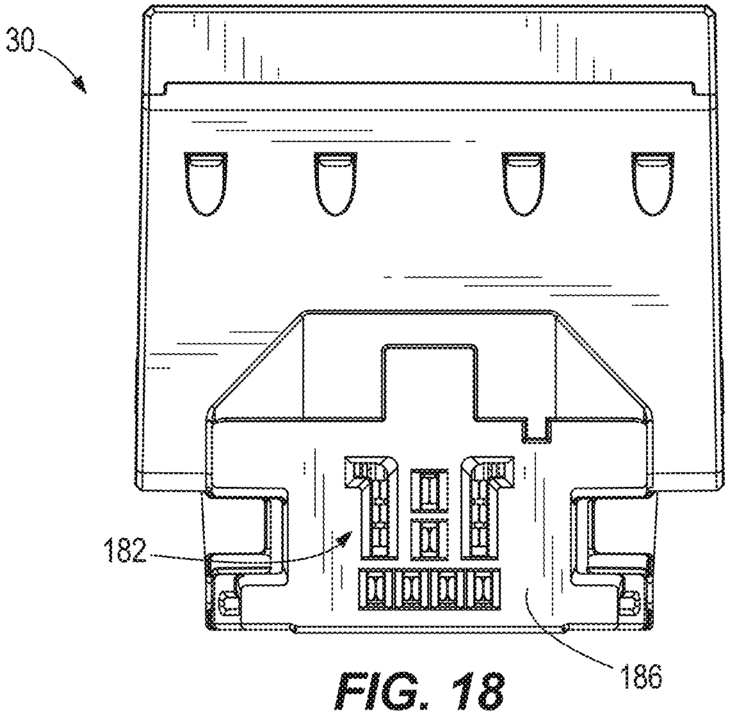
FIG. 18 is another end view of the adapter of FIG. 15.
Figure 19:
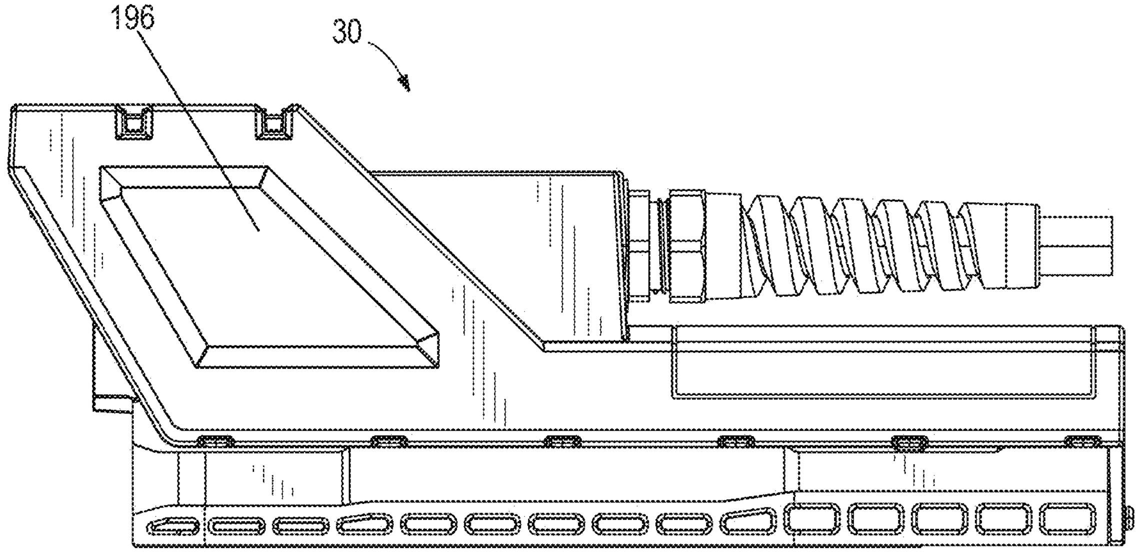
FIG. 19 is a side view of the adapter of FIG. 15.
Figure 20:
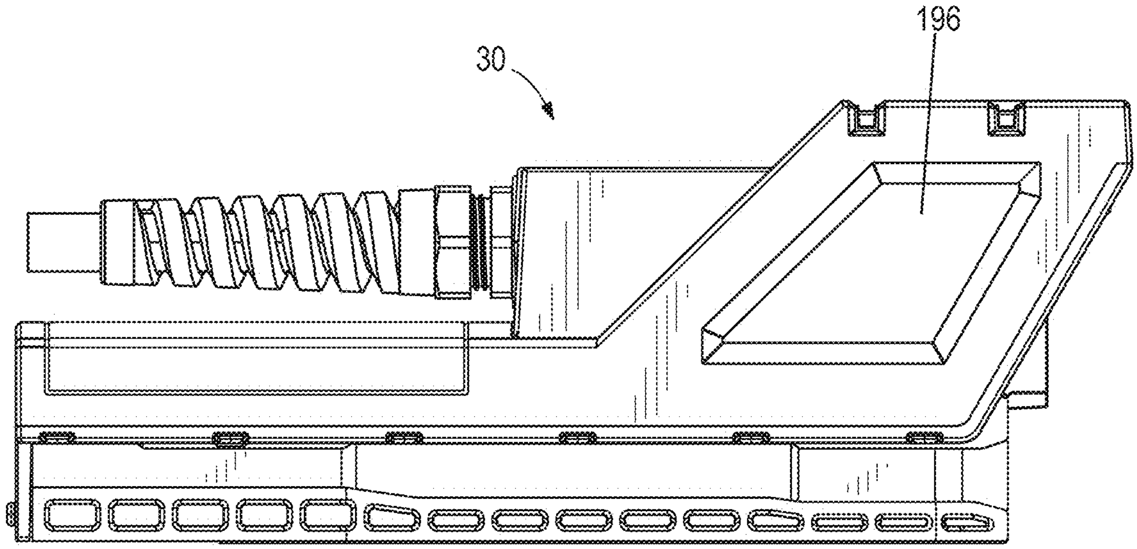
FIG. 20 is another side view of the adapter of FIG. 15.
Figure 21:
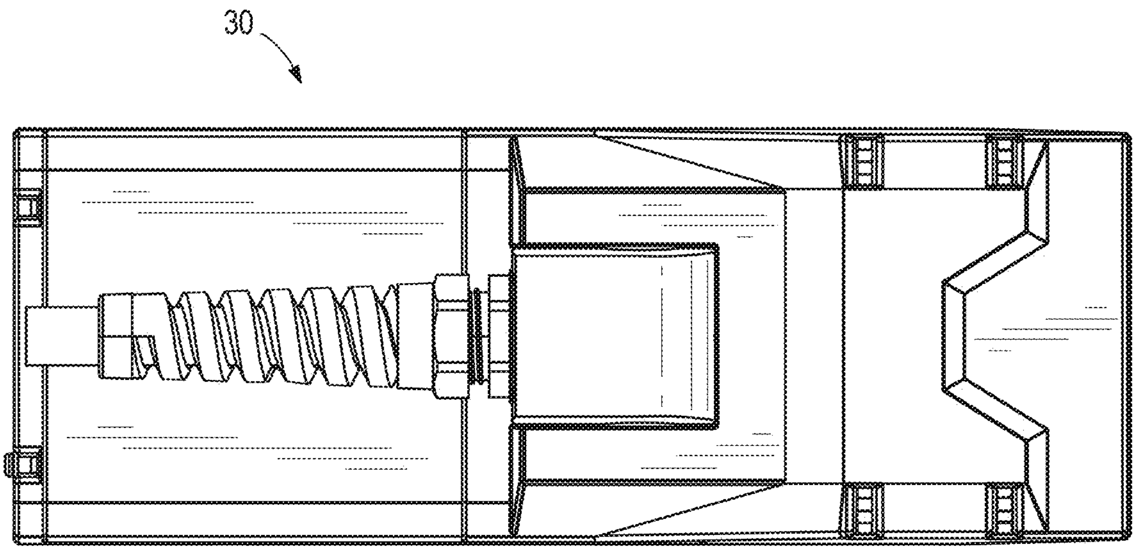
FIG. 21 is a top view of the adapter of FIG. 15.
Figure 22:
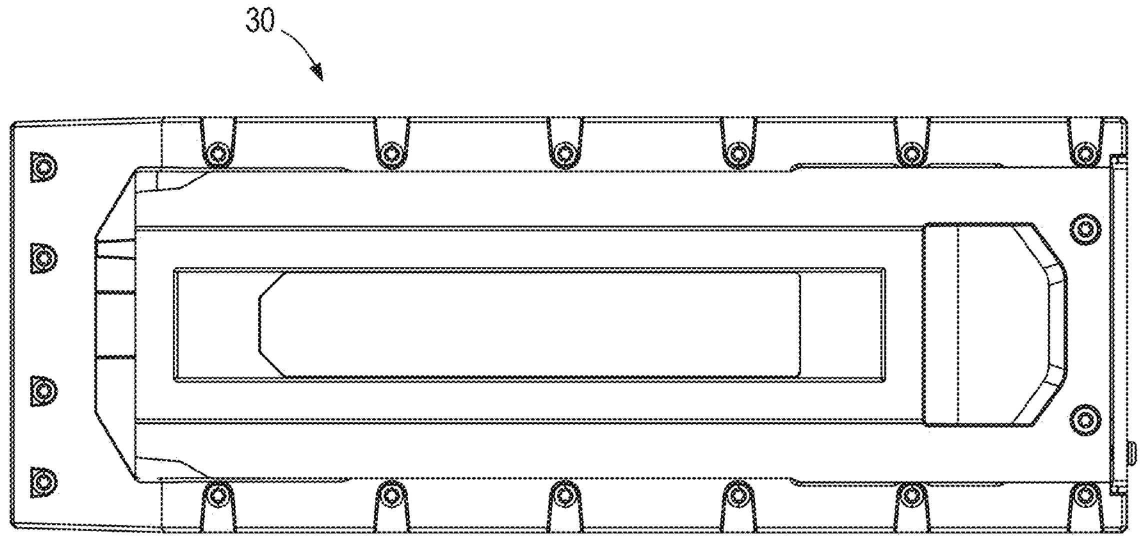
FIG. 22 is a bottom view of the adapter of FIG. 15.

A pair of laterally opposed and longitudinally extending rails 90 are formed at opposite sides of the cavity 78, each rail 90 defining an associated groove 94 (FIG. 5) between the respective rail 90 and an adjacent portion of the body of the housing 46. As will be discussed in further detail below, the rails 90 and grooves 94 on the storage portion 74 engage rails 98 and grooves 194 (FIG. 15) on the adapter 30 to retain the adapter 30 on the storage portion 74.

Figure 1B:
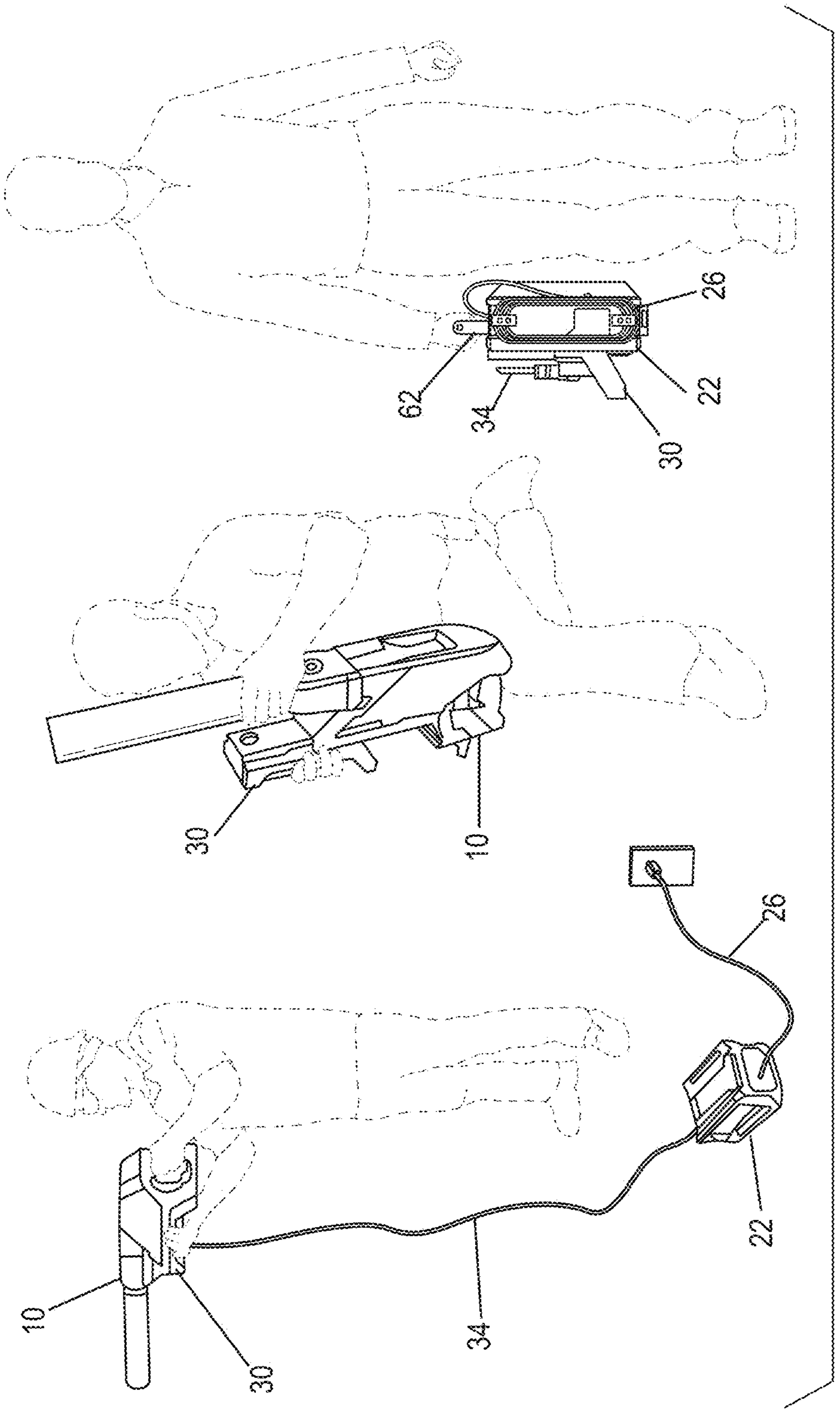
FIG. 1B includes views of the adapter assembly in various configurations.
Figure 1C:
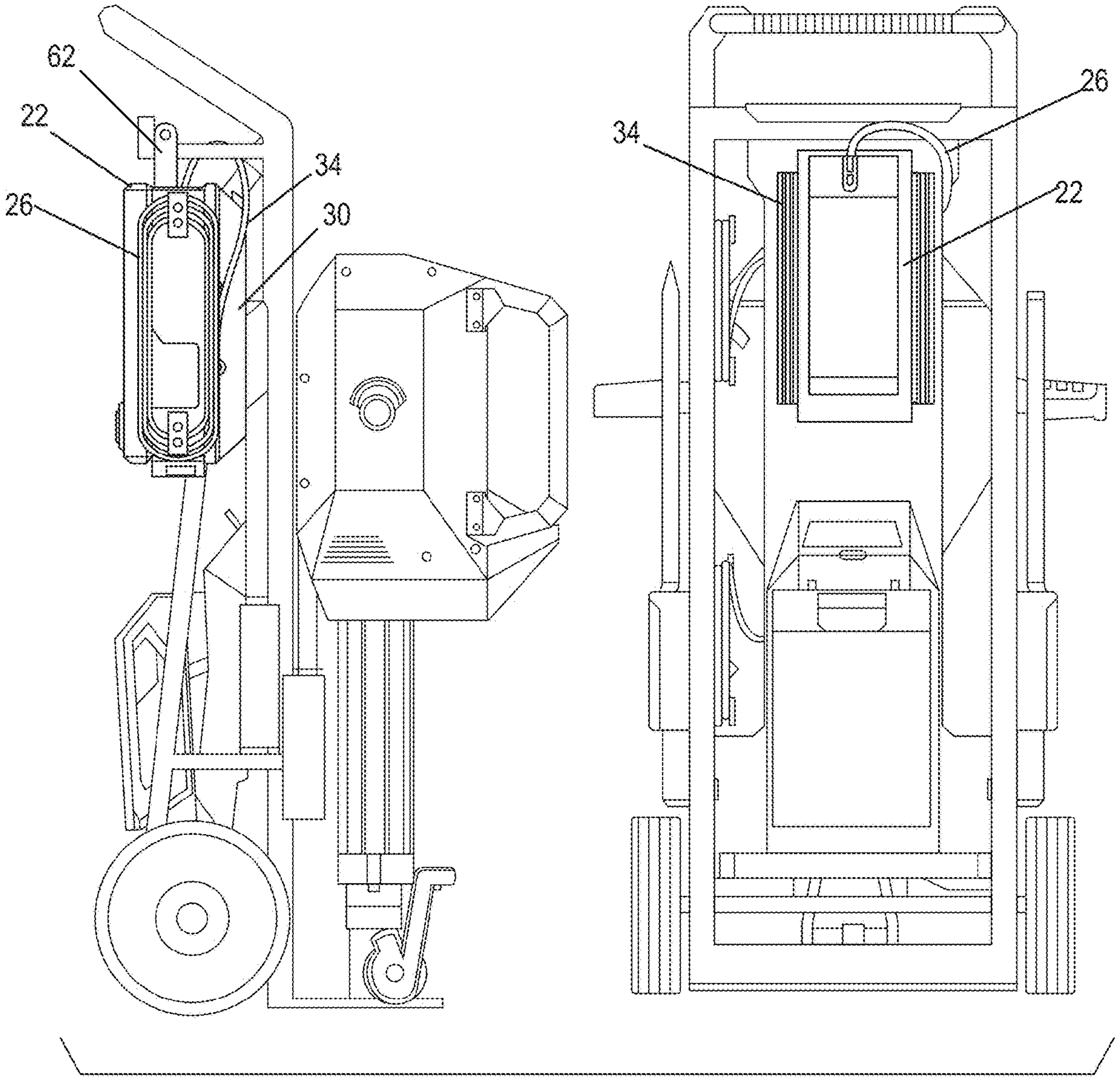
FIG. 1C includes view of the adapter assembly stored on a cart.

The illustrated power box 22 includes a cord wrap arrangement operable to selectively receive a wound cord (e.g., the power cord 26 and/or the adapter cord 34) for compact and convenient storage when the adapter assembly 18 is not in use (FIGS. 1B-1C). In the illustrated construction, a pair of cord wraps 102 are provided on opposite sides 103*a*, 103*b* of the housing 46. In the illustrated construction, each cord wrap 102 includes a pair of longitudinally opposed hooks 104 projecting laterally outwardly from the housing 46. That is, in the illustrated construction, a first cord wrap 102 is configured to receive the adapter cord 34 in a wound configuration and a second cord wrap 102 is configured to receive the power cord 26 in a wound configuration. In other constructions (not shown), the power box 22 may include a single cord wrap 102 (large enough to receive the provided cords (e.g., the power cord 26 and the adapter cord 34)) or more than two cord wraps 102.

The adapter cord 34 has a length (e.g., at least about 2 meters (m)) and a diameter (e.g., about 10 mm to about 13 mm). In the illustrated construction, the cord length is approximately 3 m, and the cord diameter is approximately 12.5 mm. As shown in FIG. 1B, when the adapter 30 is engaged with the tool 10 (e.g., a core drill), the illustrated cord length allows a user to operate the tool 10 at or near an eye level while the power box 22 is resting at or near ground level, which limits excess adapter cord 34 that can be cumbersome during use, for storage, etc. Moreover, the length of the cord 34 can easily and conveniently be wrapped around either cord wrap 102. In other constructions (not shown), the cord length can be less than or greater than 3 meters so as to be adapted to particular uses of the tool 10.

Figure 5:
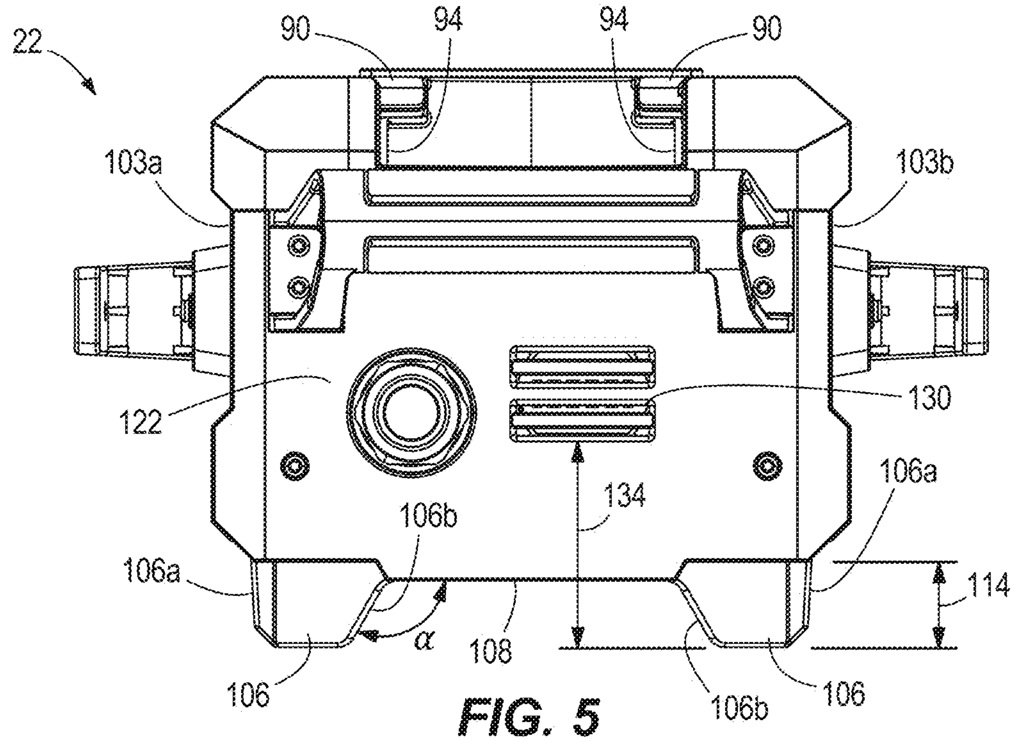
FIG. 5 is an end view of the power box of FIG. 3.
Figure 6:
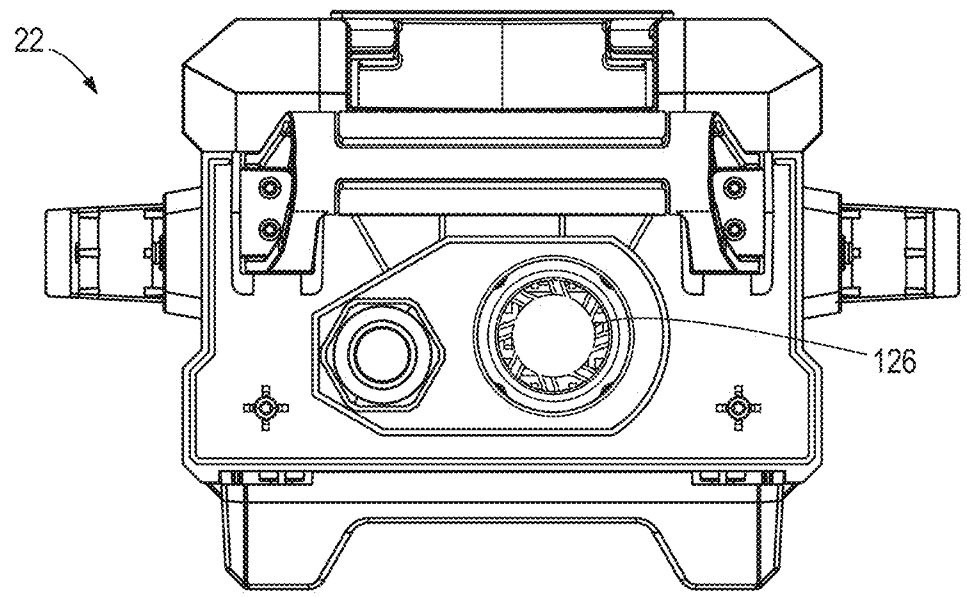
FIG. 6 is another end view of the power box of FIG. 3, illustrating the power box with a fan grille removed.

The power box 22 has at least one foot 106 that projects downwardly from the housing 46 and that is engageable with a support surface. In the illustrated construction, the power box 22 has a pair of longitudinally-extending feet 106 at opposite sides of the housing 46. In particular, each of the feet 106 is coupled to a second or bottom side 108 of the housing 46 and has a first surface 106*a* that is substantially perpendicular to the second side 108 of the power box and a second surface 106*b* that is oriented at an angle $\alpha$ relative to the second side 108 of the power box 22. As shown in FIG. 5, the angle $\alpha$ is greater than 90 degrees (e.g., oblique), but any suitable angle may be used in other or additional constructions. Moreover, each of the feet 106 has a polygonal cross-section. In other or additional constructions, the power box may have four separate feet (not shown) positioned proximate the corners. In still other constructions, the power box may have feet having any suitable location and configuration. The feet 106 provide the power box 22 with a stable and robust resting surface 110 when the power box 22 is supported on the floor or the ground. For example, the feet 106 allow the power box 22 to straddle obstacles or otherwise address uneven ground surfaces. The feet 106 also raise the housing 46 to a first height 114 (FIG. 5) above the ground, thereby preventing or inhibiting contaminants (e.g., pooled liquids, dust, other debris, etc.) from entering the housing 46 and interfering with the internal components 58 (FIG. 14) of the power box 22. In the illustrated construction, the first height 114 is approximately 30 mm, but may range from 20 mm to 40 mm.

The adapter assembly 18 includes a circuit (not shown) operable, in the illustrated construction, to receive as input AC and to output DC power. The circuit includes the necessary electrical components to operate as an AC/DC adapter. The circuit may include other components (e.g., a battery charging circuit portion to charge a connected battery pack 14, a pass-through circuit portion to output AC power to an AC outlet, an output circuit portion to output DC power to a DC power outlet, etc.). The circuit further includes a Ground Fault Circuit Interrupt (GFCI) protection system to protect against electrical shock during operation. GFCI controls 118 (FIG. 3) are located on the housing 46 adjacent the storage portion 74.

With reference to FIGS. 4-8, an intake plate 122 located on the first end 66 of the housing 46 adjacent a fan 126. Laterally-extending slots formed in the intake plate 122 define an intake grille 130 adjacent the fan 126. Similarly, an exhaust plate 138 is located on the second end 70 of the housing 46 opposite the intake plate 122 and fastened to the housing via fasteners (e.g., screws). Laterally-extending slots formed in the exhaust plate 138 define an exhaust grille 142. Each plate 122, 138 is connected to the housing 46 with fasteners (e.g., screws).

When the illustrated power box 22 is resting on the feet 106, the intake plate 122 and the intake grille 130 and/or the exhaust plate 138 and the exhaust grille 142 are positioned at respective second and third heights 134, 146 above the ground (a ground clearance of at least about 45 mm (e.g., 50.8 mm)) to prevent or inhibit contaminants (e.g., pooled liquids, dust, other debris, etc.) from entering the housing 46 through the grille(s) 130, 142 into the internal compartment C and interfering with the internal components 58 (FIG. 14) of the power box 22. In other constructions (not shown), the grille(s) 130, 142 may be higher or lower.

Figure 7:
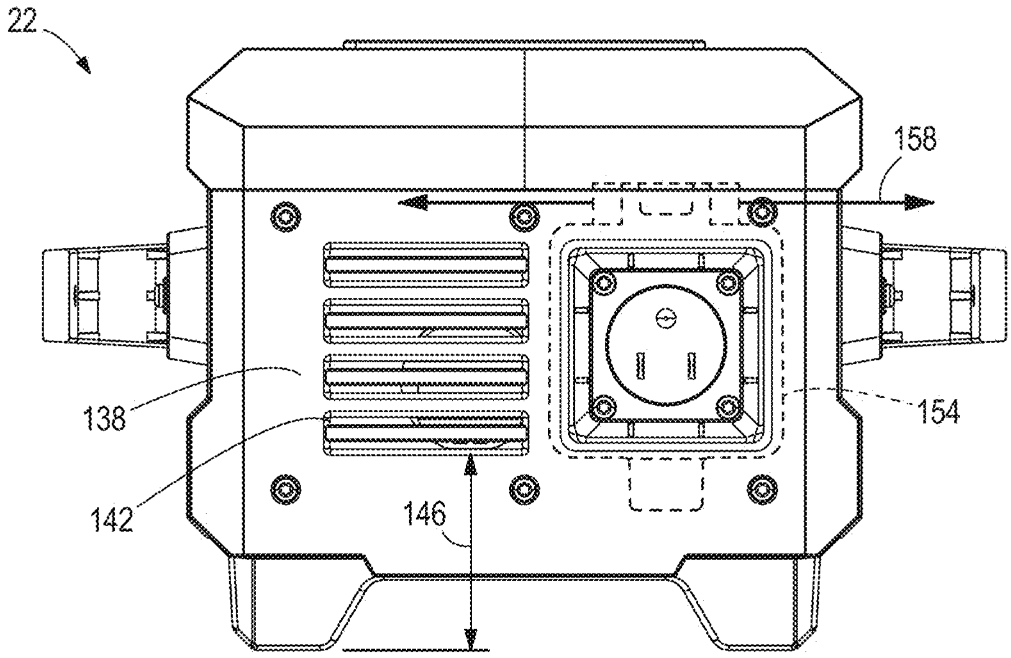
FIG. 7 is another end view of the power box of FIG. 3.
Figure 8:
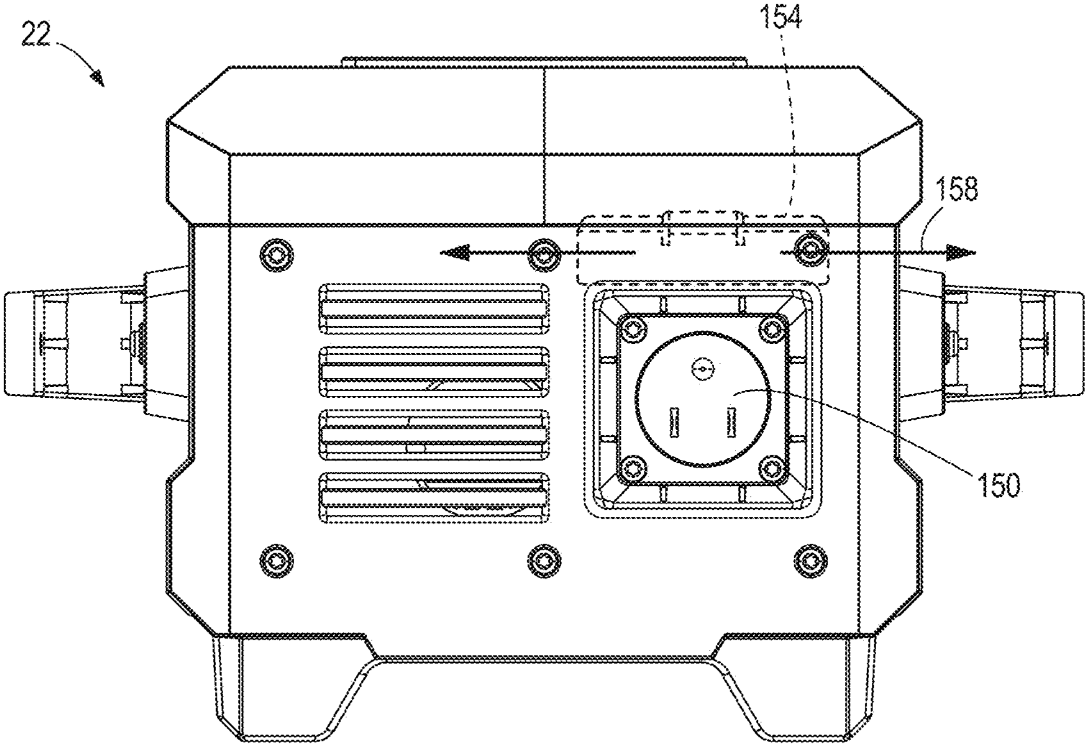
FIG. 8 is another end view of the power box of FIG. 3, illustrating the cord door in an open position.
Figure 9:
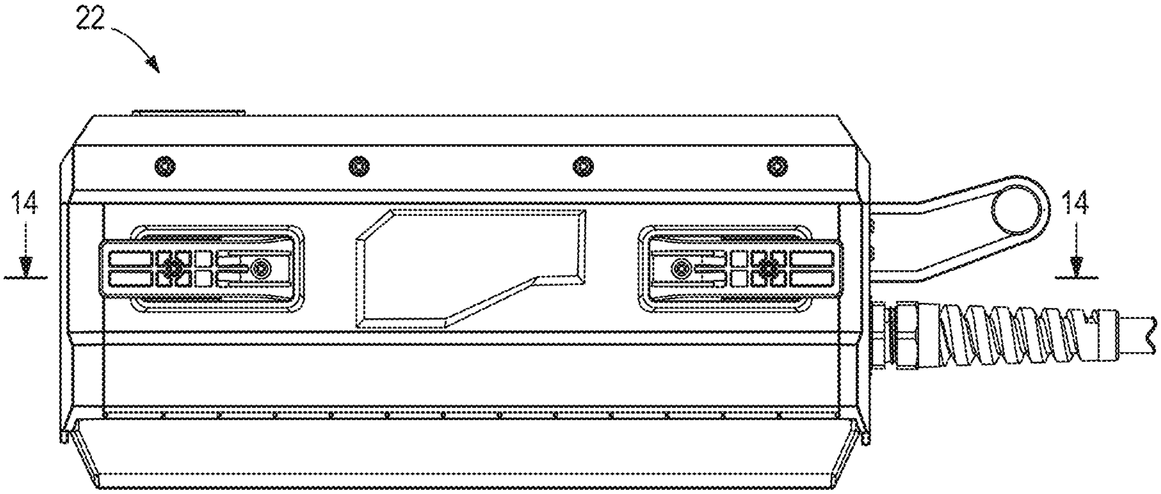
FIG. 9 is a side view of the power box of FIG. 3.
Figure 10:
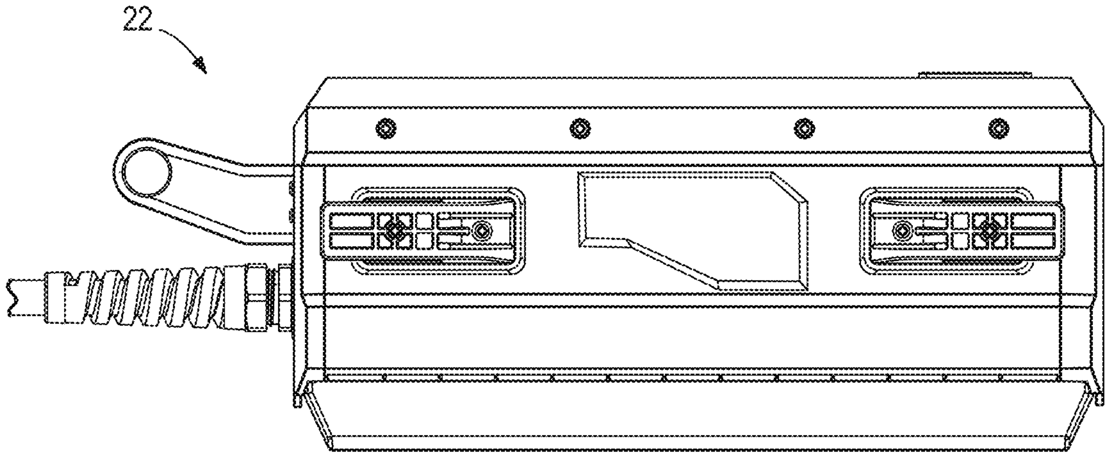
FIG. 10 is another side view of the power box of FIG. 3.
Figure 11:
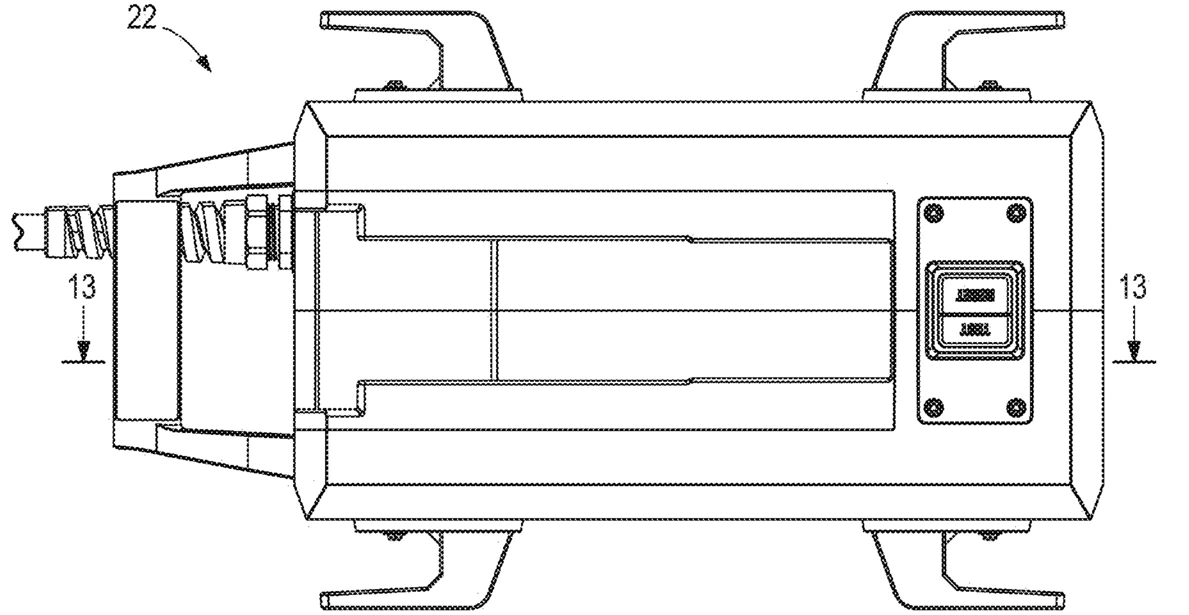
FIG. 11 is a top view of the power box of FIG. 3.
Figure 12:
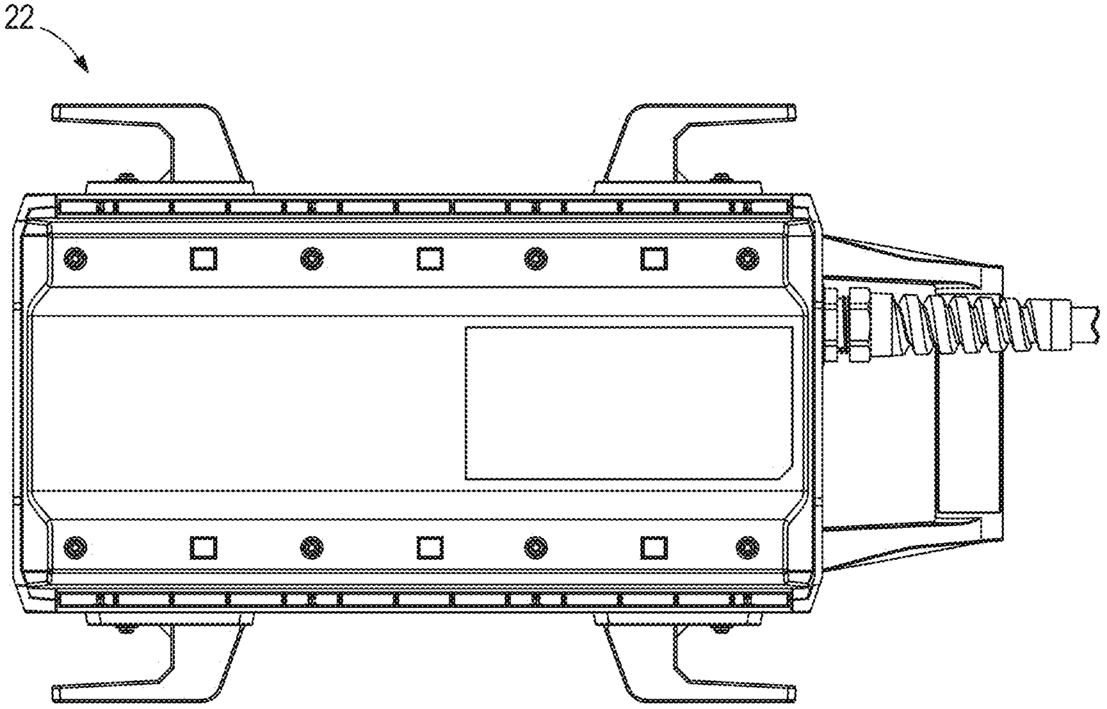
FIG. 12 is a bottom view of the power box of FIG. 3.

With reference to FIGS. 7-8, the second end 70 also includes a power inlet 150 located adjacent the exhaust grille 142 that selectively receives and electrically connects the power box 22 to a power source (e.g., an AC power source) through the power cord 26. The illustrated power inlet 150 is a male power inlet that engages a female power plug; in other constructions (not shown), the power inlet 150 may be a female power inlet that engages a male power plug.

Figure 7A:
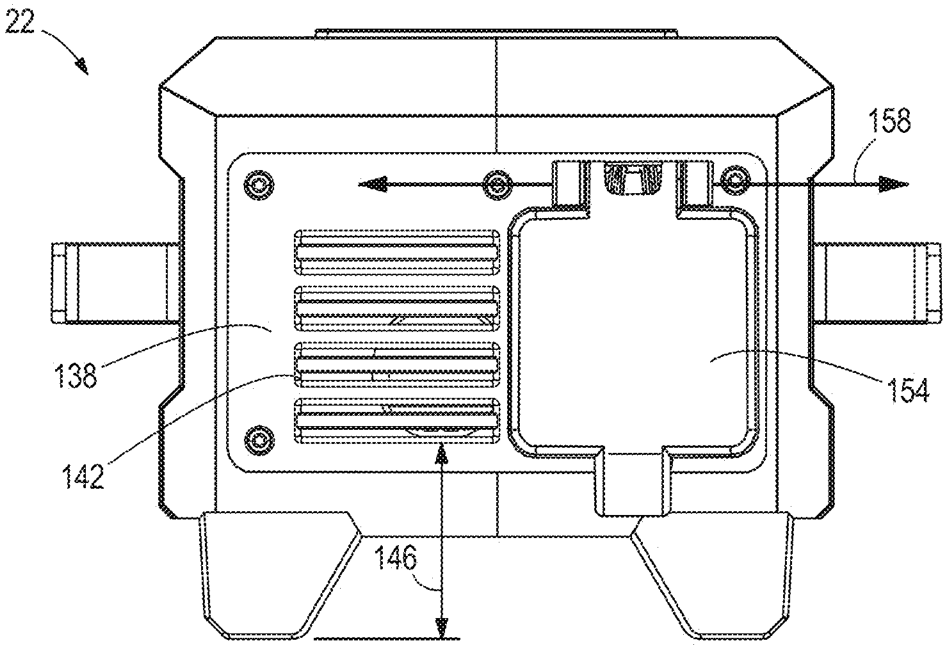
FIG. 7A is another end view of the power box of FIG. 3, illustrating a cord door in a closed position

In the construction illustrated in FIG. 7A, a door 154 is located adjacent to and covers the power inlet 150 when the power inlet 150 is not engaged with the power cord 26. The door 154 is pivotable about a door axis 158 between an open position and a closed position. In some constructions, the door 154 may be biased (e.g., by a spring (not shown)) toward the closed position to automatically close and cover the power inlet 150 when the power inlet 150 is not in use. When closed, the door 154 may provide a degree of protection against incidental contact with the enclosed power inlet 154 and a degree of protection against contaminants, sprayed liquid, etc.

Figure 13:
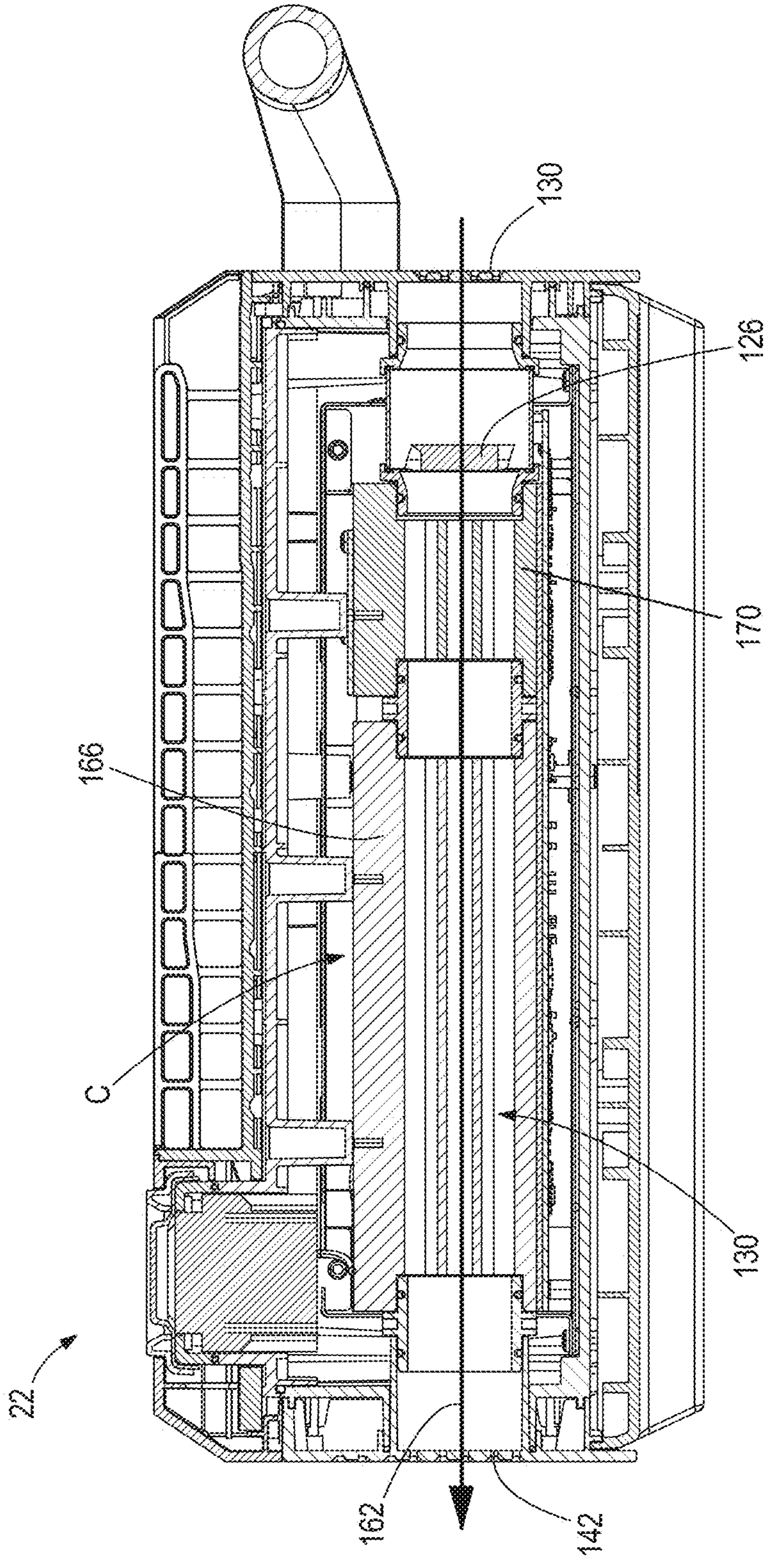
FIG. 13 is a cross-sectional view of the power box of FIG. 3, taken generally along line 13-13 of FIG. 11.
Figure 14:
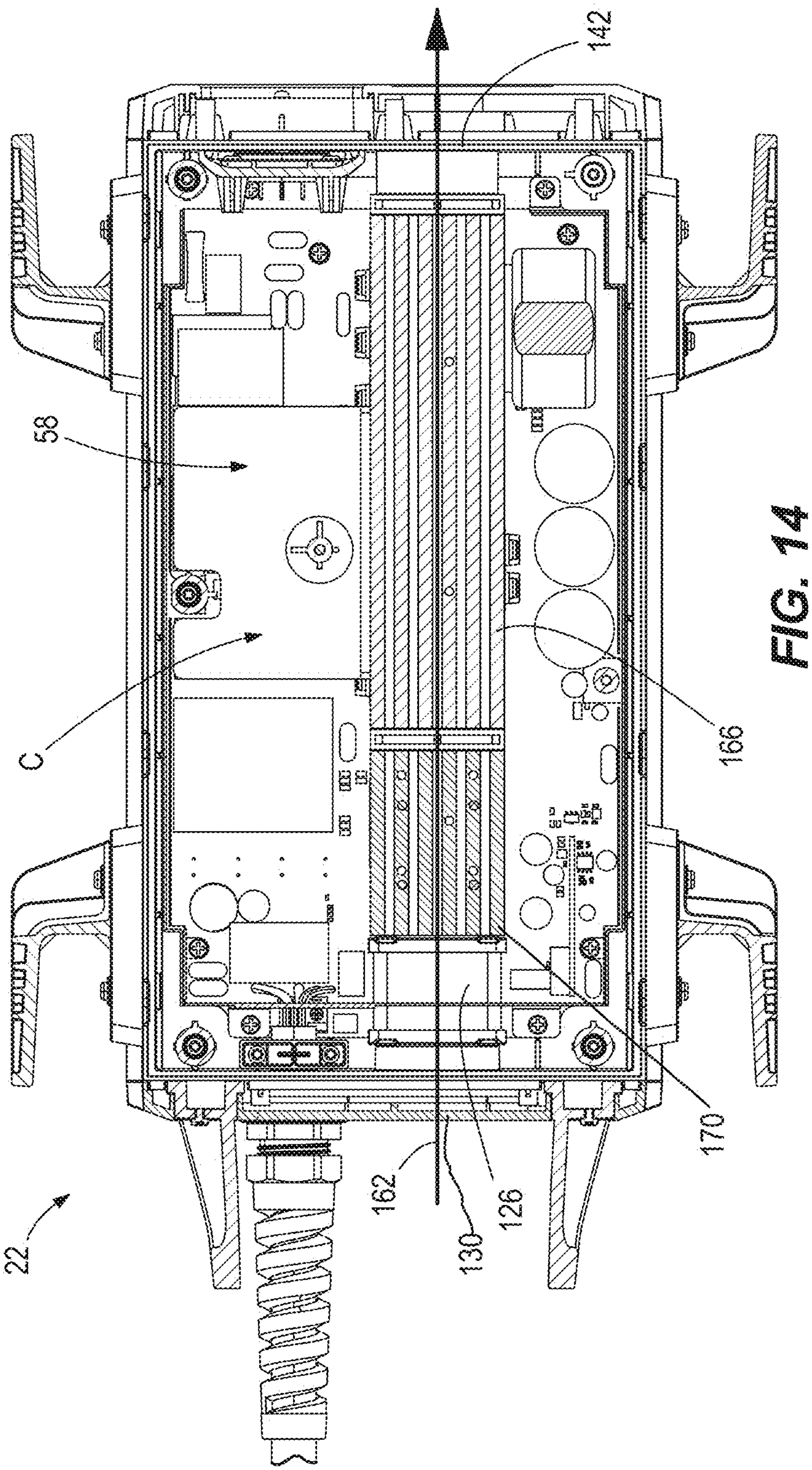
FIG. 14 is another cross-sectional view of the power box of FIG. 3, taken generally along line 14-14 of FIG. 9.

With reference to FIGS. 13-14, the housing 46 defines an airflow path 162 extending within the internal compartment C between the intake grille 130 and the exhaust grille 142 to cool and ventilate components of the power box 22 during operation. Specifically, a heat sink 166 is located within the internal compartment C and includes a finned channel 170 extending longitudinally therethrough. The airflow path 162 is fluidly isolated from the remainder of the internal compartment C, so that the airflow path 162 provides cooling and ventilation to the power box 22 without exposing the internal components 58 to contaminants.

When the fan 126 of the illustrated power box 22 is energized, air flows along the airflow path 162 from the intake grille 130 through the fan 126 and into the finned channel 170, and then exits through the exhaust grille 142. In other constructions (not shown), the airflow path 162 may be reversed so that air enters through the exhaust grille 142 and flows through the finned channel 170 before passing through the fan 126 and exiting through the intake grille 130.

FIGS. 15-24 illustrate that the adapter 30 is operable to releasably connect to and supply power to the tool 10. The adapter 30 includes a body 174 having an engagement portion 178 that selectively engages the power source receiving portion 42 (FIG. 1A) of the tool 10 to supply power to the tool 10. The engagement portion 178 includes adapter terminals 182 disposed on a forward face 186, and a pair of adapter rails 98 provided at opposite sides of the engagement portion 178 and extending longitudinally between the forward face 186 and a rear face 190. Each adapter rail 98 defines an associated adapter groove 194 between the adapter rail 98 and an adjacent portion of the engagement portion 178.

As shown in FIGS. 1A-1B, the adapter 30 may include a grip portion 196 engageable by a user to facilitate engagement of the adapter 30 with the tool 10, the power box 22, etc. The grip portion 196 may include an overmold material to facilitate gripping. The grip portion 196 may be positioned on one or more surfaces of the adapter 30.

Figure 25:
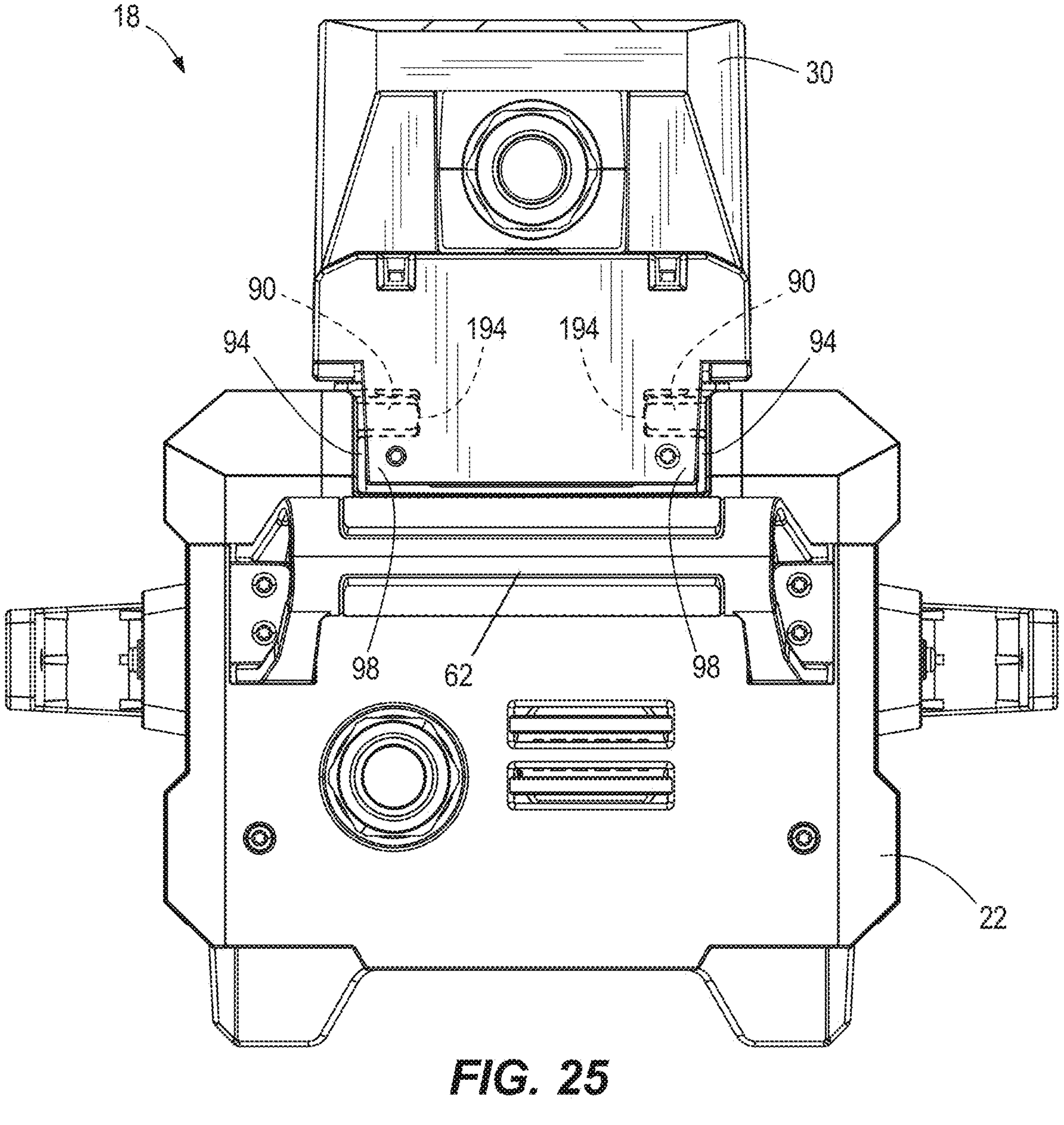
FIG. 25 is an end view of the adapter assembly of FIG. 1A.
Figure 26:
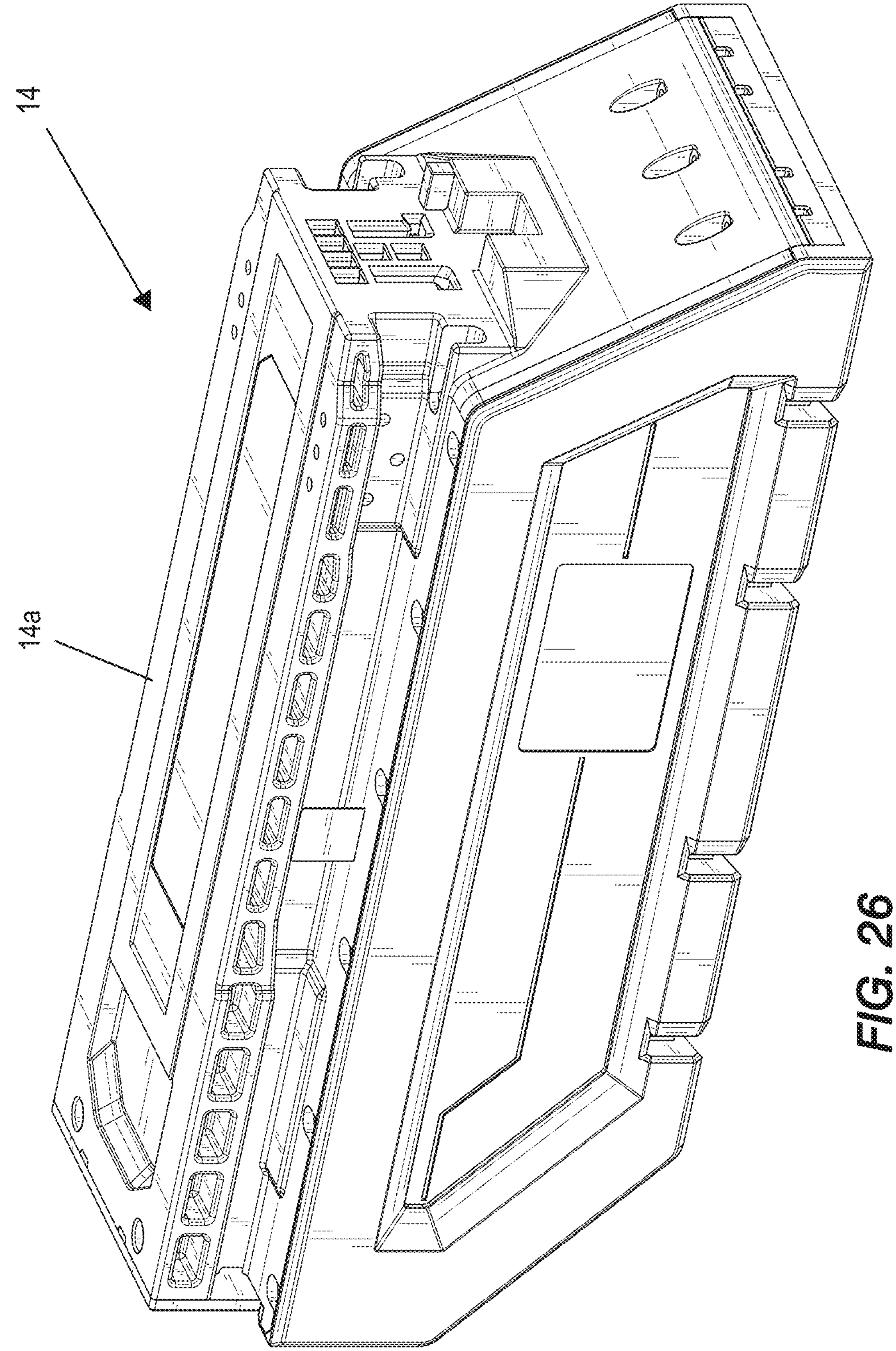
FIGS. 26-31 illustrate a battery pack operable with the electrical device, the power adapter and the battery charger shown in FIG. 1A.
Figure 27:
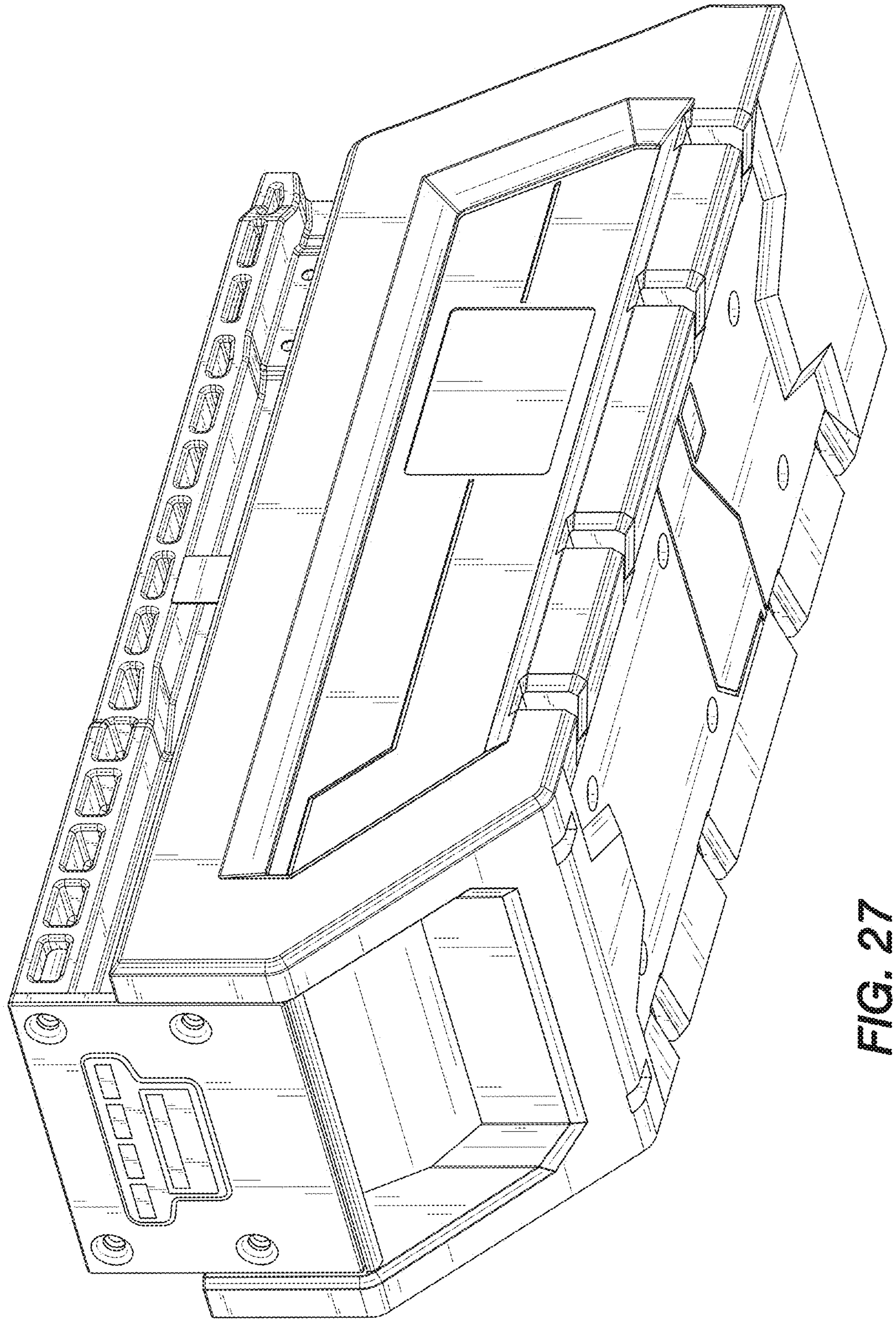
Figure 28:
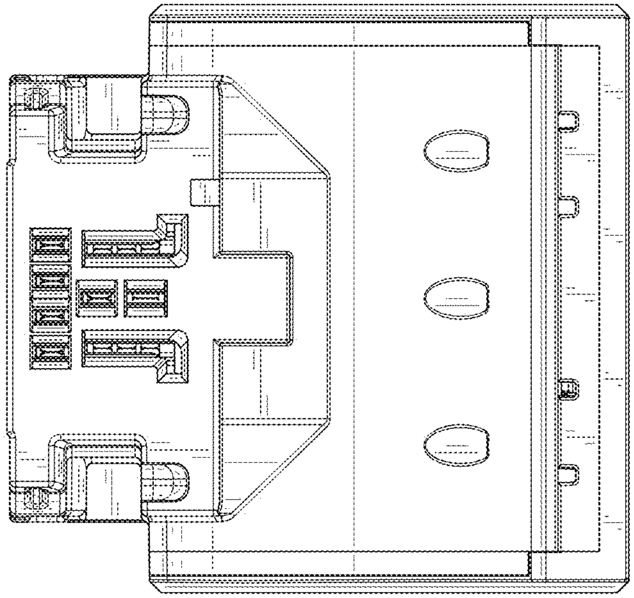
Figure 29:
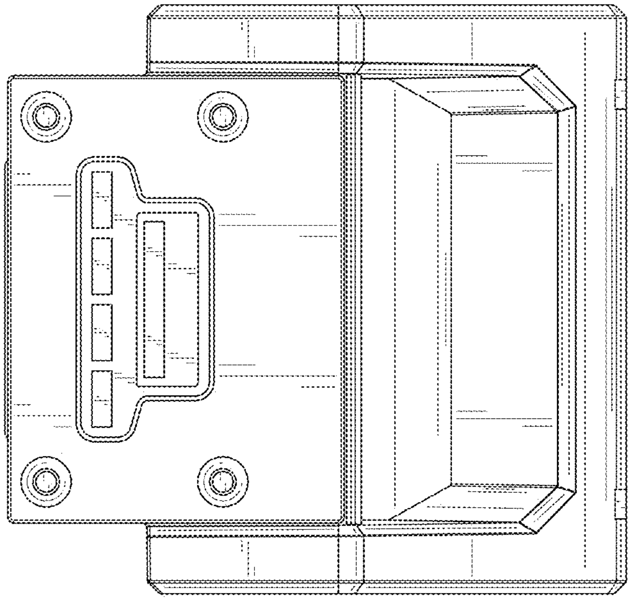
Figure 30:
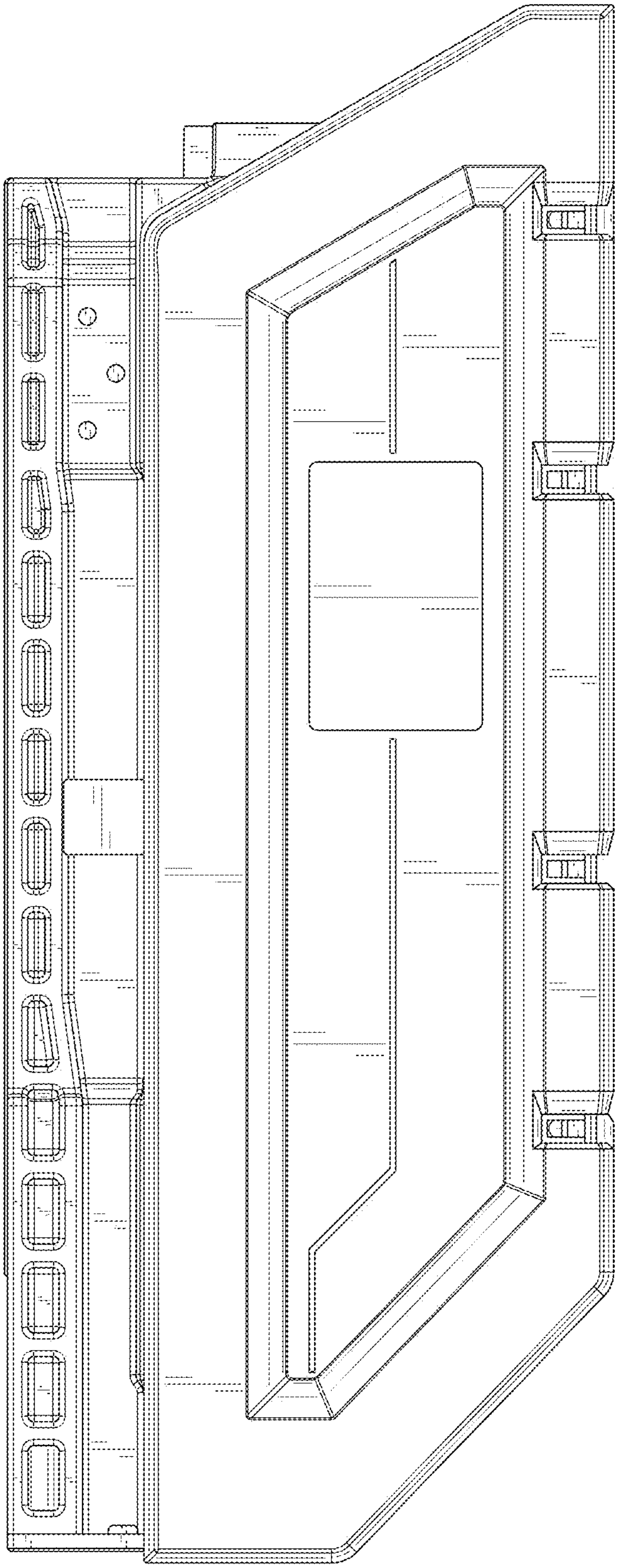
Figure 31:
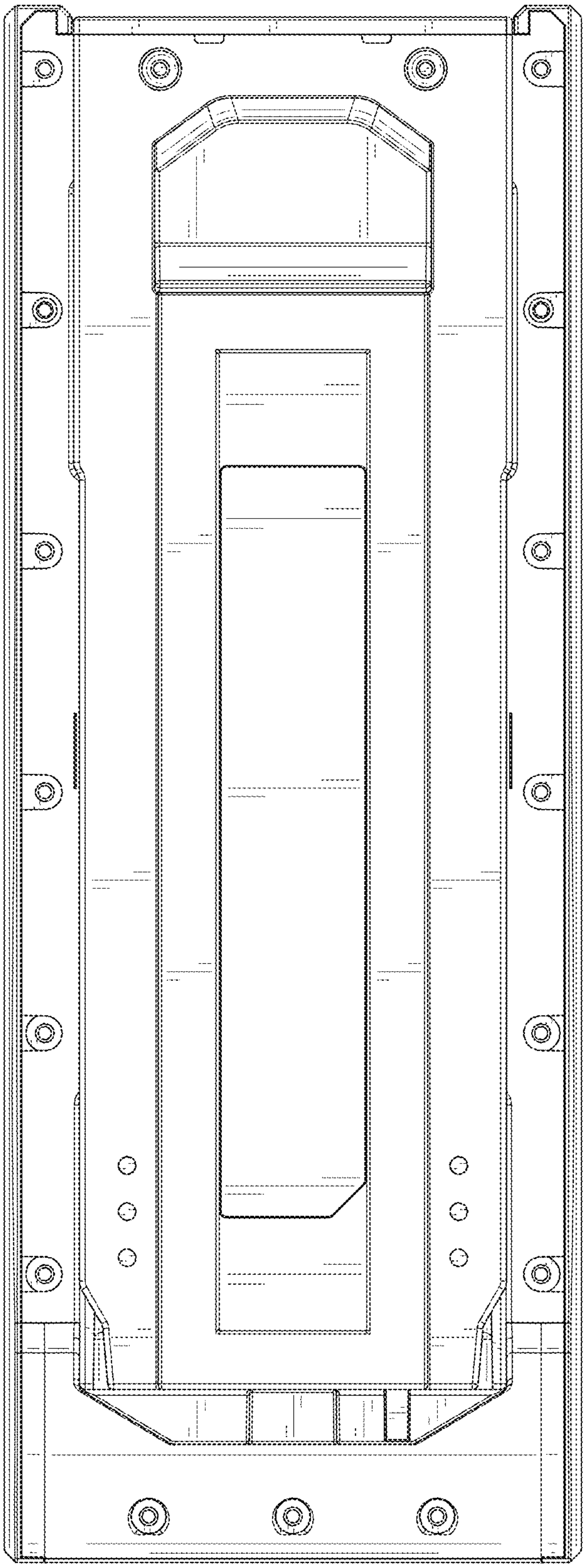
Figure 32:
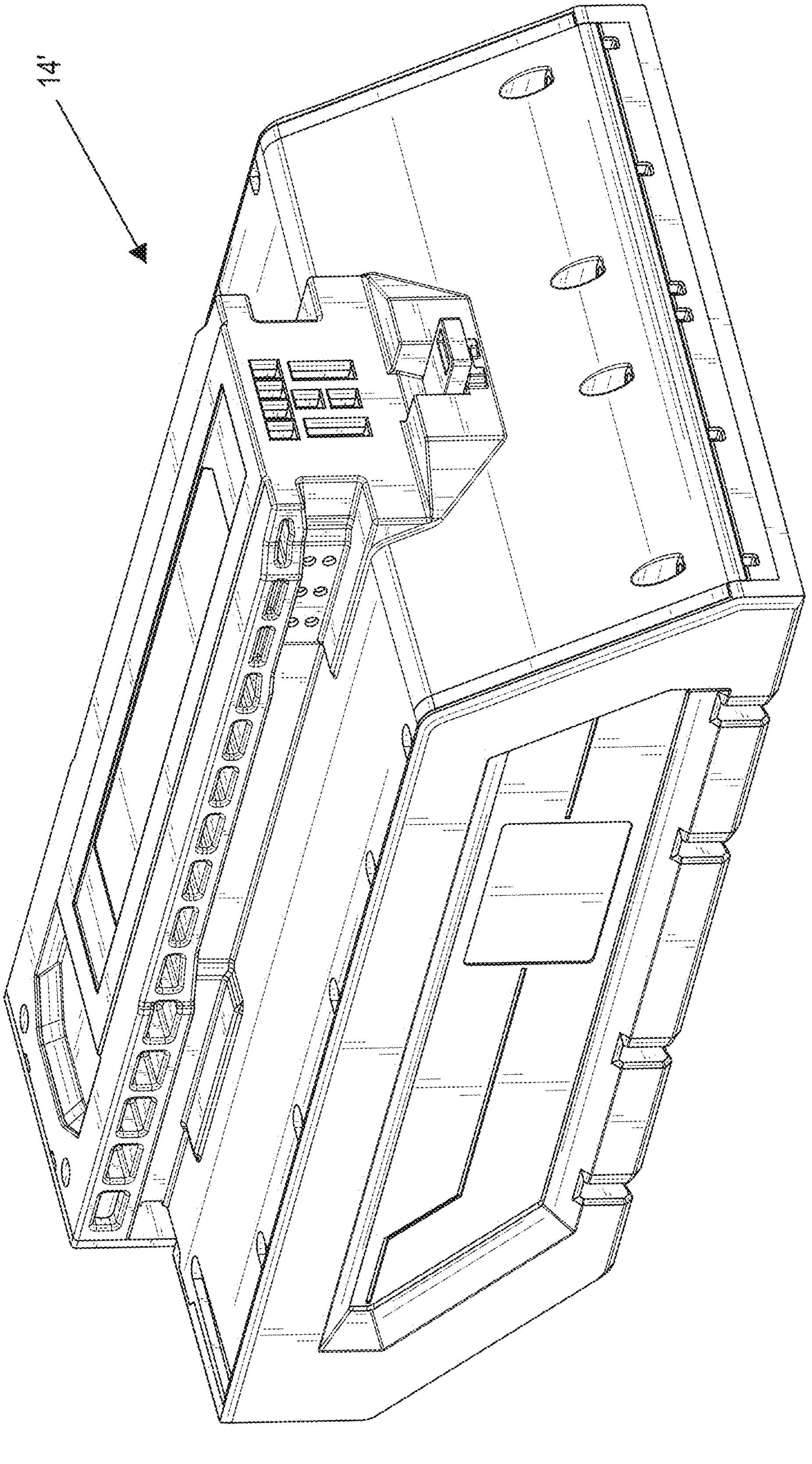
FIGS. 32-37 illustrate another construction of a battery pack operable with the electrical device, the power adapter and the battery charger shown in FIG. 1A.
Figure 33:
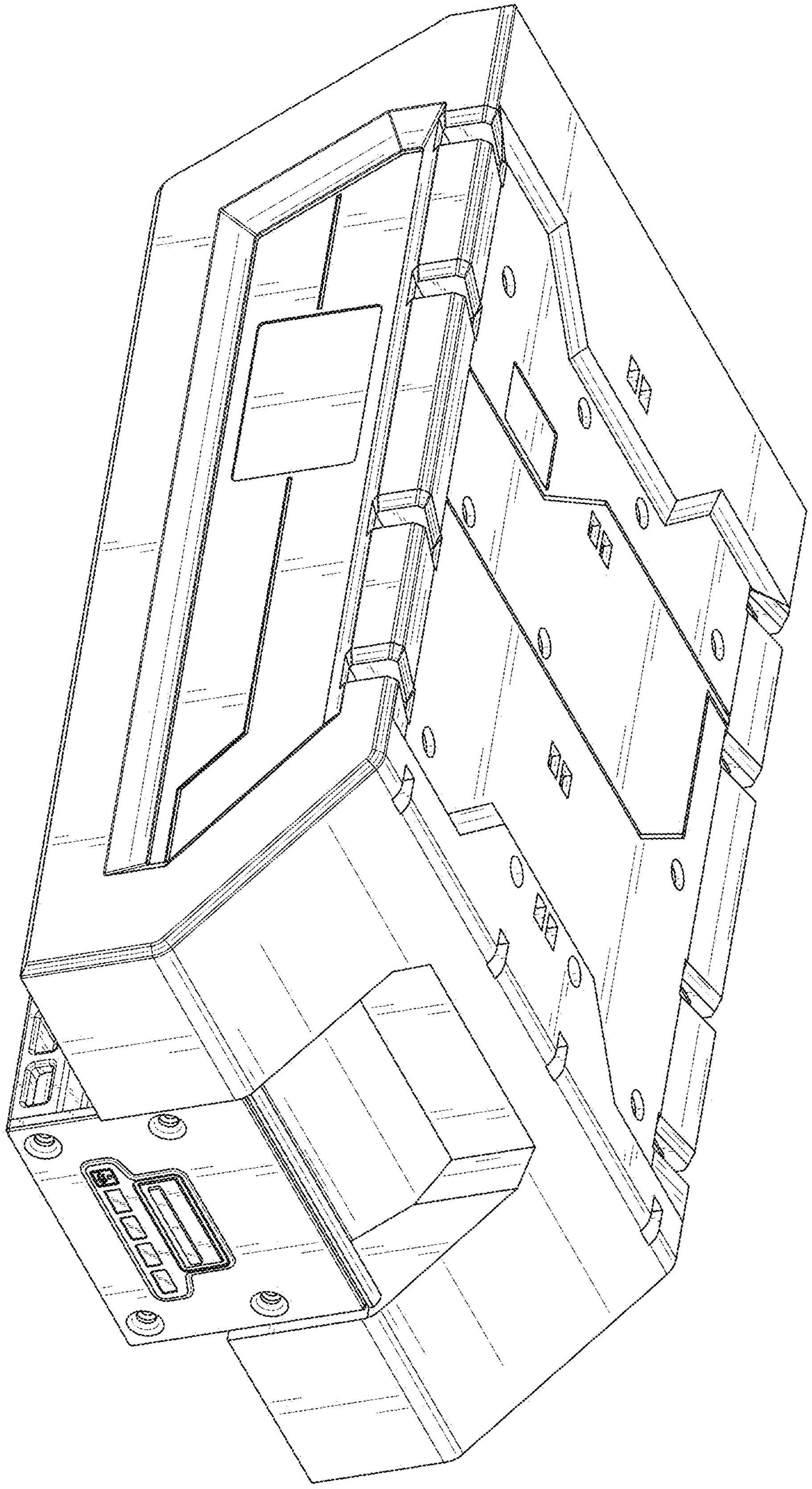
Figure 34:
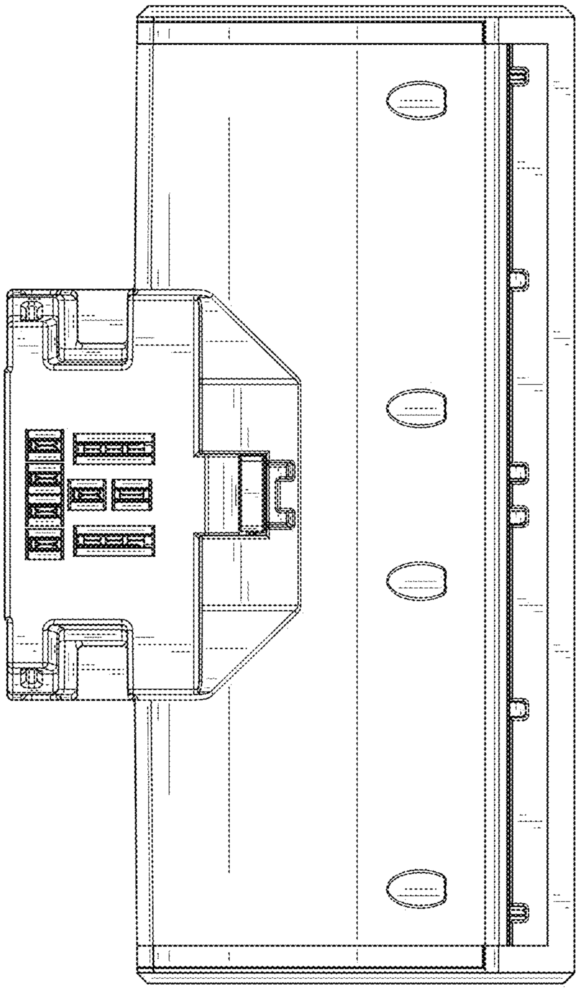
Figure 35:
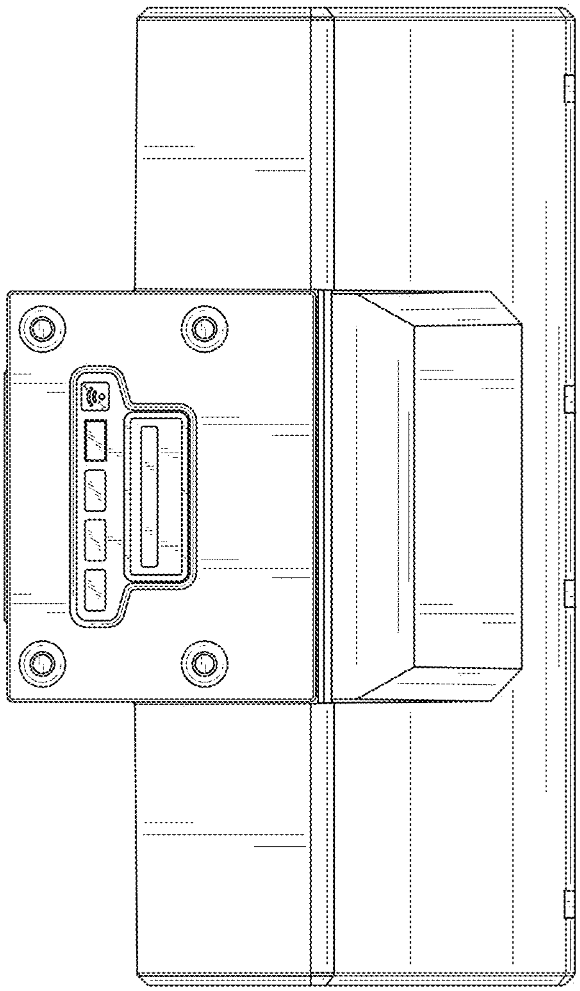
Figure 36:
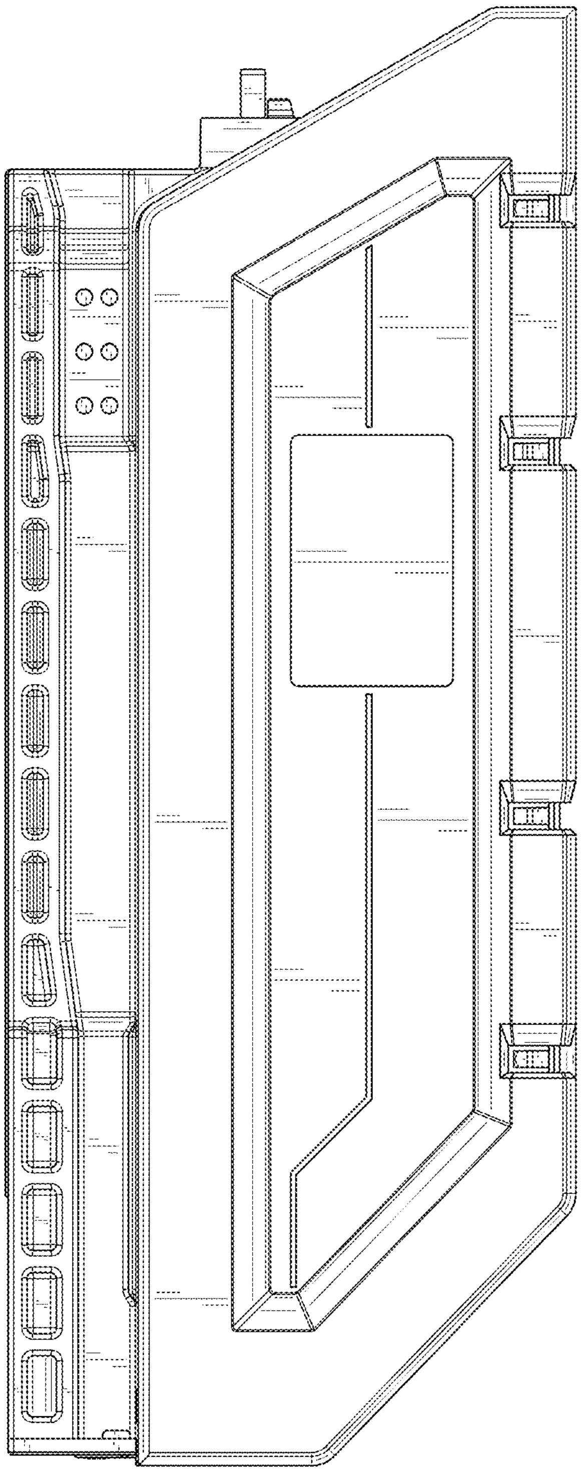
Figure 37:
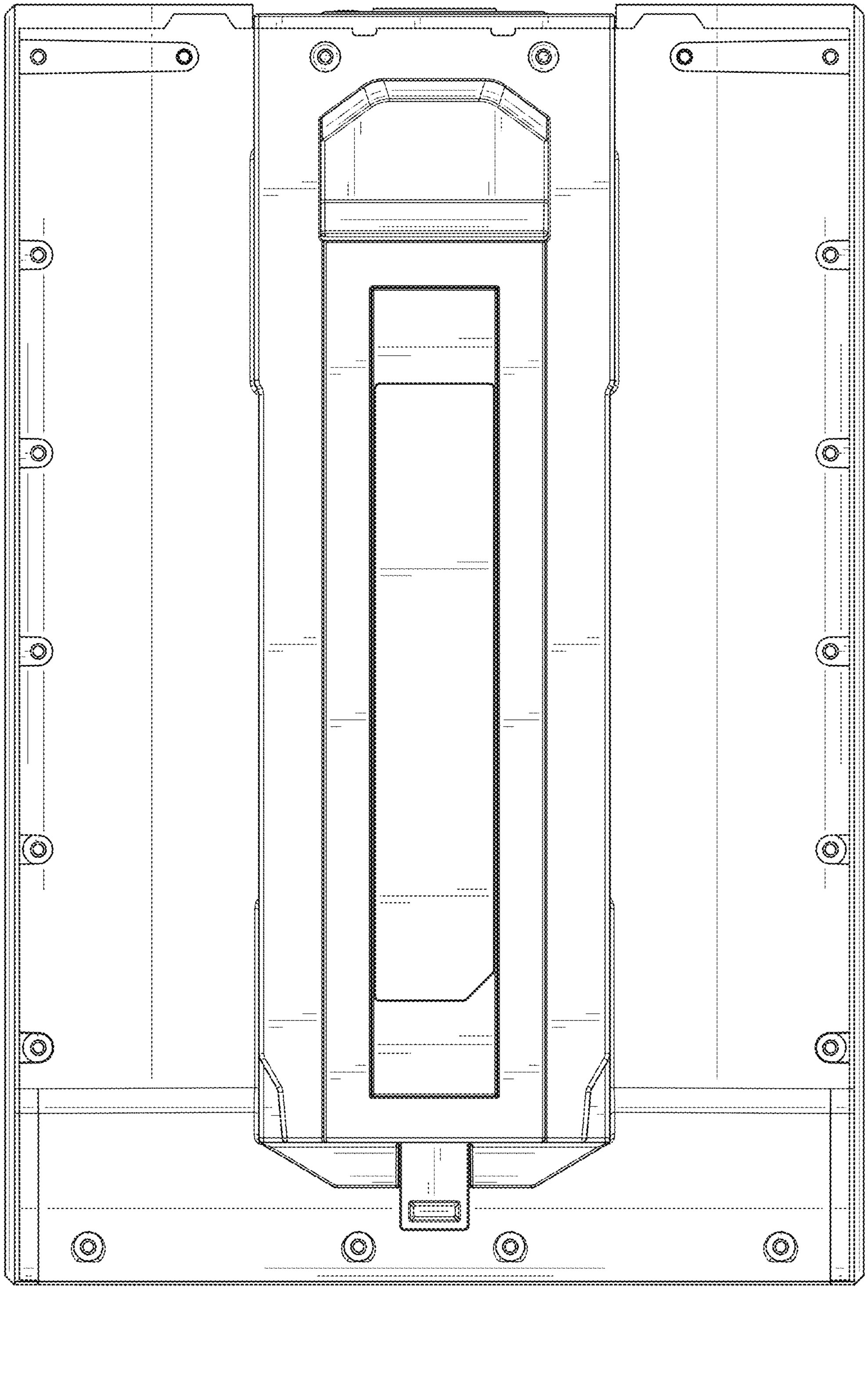

FIGS. 2 and 25 illustrate the adapter 30 in a nested or stowed position atop the power box 22 for convenient transportation or storage when the adapter assembly 18 is not in use. In the stowed position, the engagement portion 178 of the adapter 30 engages the storage portion 74 of the power box 22. The adapter 30 is loaded onto the power box 22 by first positioning the forward face 186 proximate the open end 82 and then sliding the adapter 30 toward the closed end 86 to engage the adapter rails 98 with the storage grooves 94 and the storage rails 90 with the adapter grooves 194. Once engaged, the closed end 86 abuts the adapter terminals 182 to shield the adapter terminals 182 from dust or other debris. When the power box 22 is transported using the handle 62, gravity maintains the adapter 30 in the stowed position. In other or additional constructions, the adapter 30 can be secured to the power box 22 in the stowed position. That is, in other or alternative constructions the adapter may be secured via a friction fit or a latching mechanism. In particular, the power box 22 may include a latching mechanism (not shown) similar to that of the associated power tool 10.

Although not shown, the power source receiving portion 42 (FIG. 1A) of the tool 10 also includes a pair of tool rails and tool grooves. The adapter rails 98 and grooves 194 engage the tool rails and grooves in a manner similar to that described above with respect to the rails 90 and grooves 94 of the storage portion 74. When engaged with the tool 10, the adapter terminals 182 interface with tool terminals (not shown) located on the support portion 42 to electrically couple the tool 10 to the adapter assembly 18.

Figure 23:
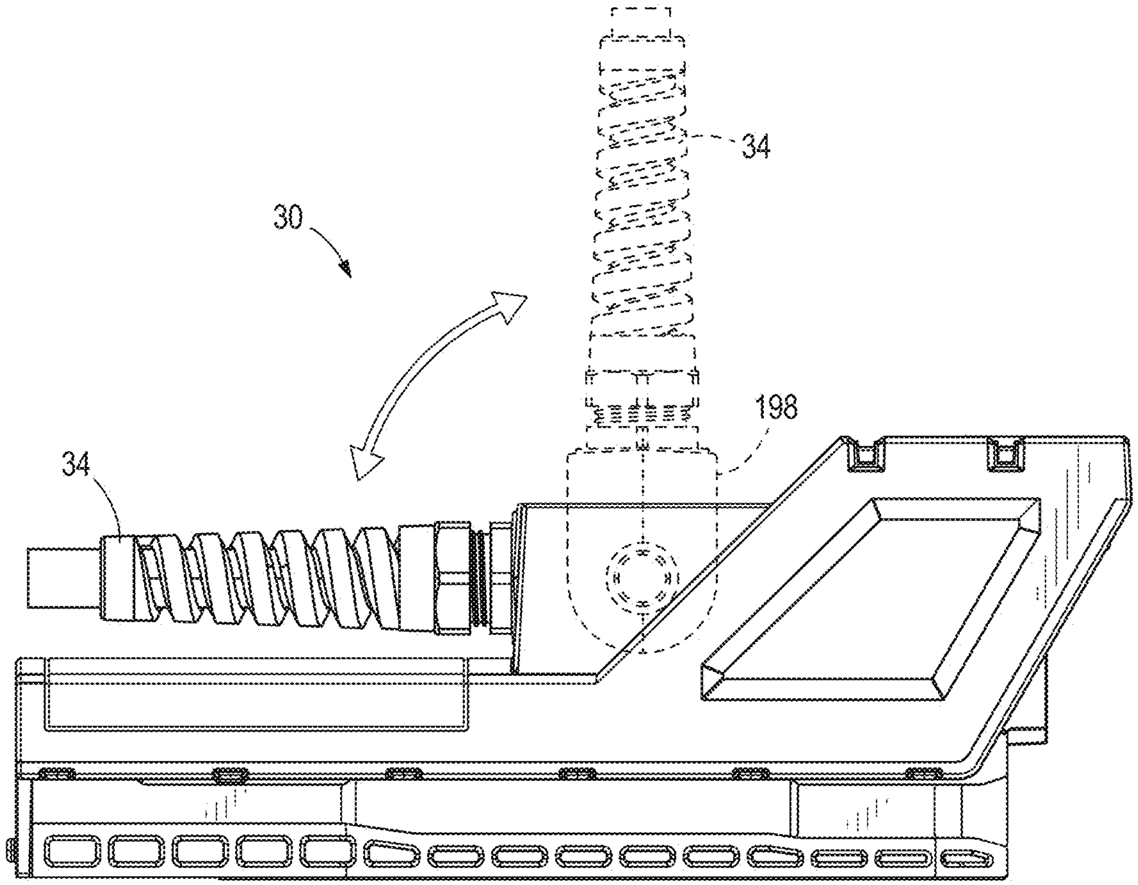
FIG. 23 is another side view of the adapter of FIG. 15, illustrating an adapter cord pivotable between a vertical orientation and a horizontal orientation.
Figure 24:
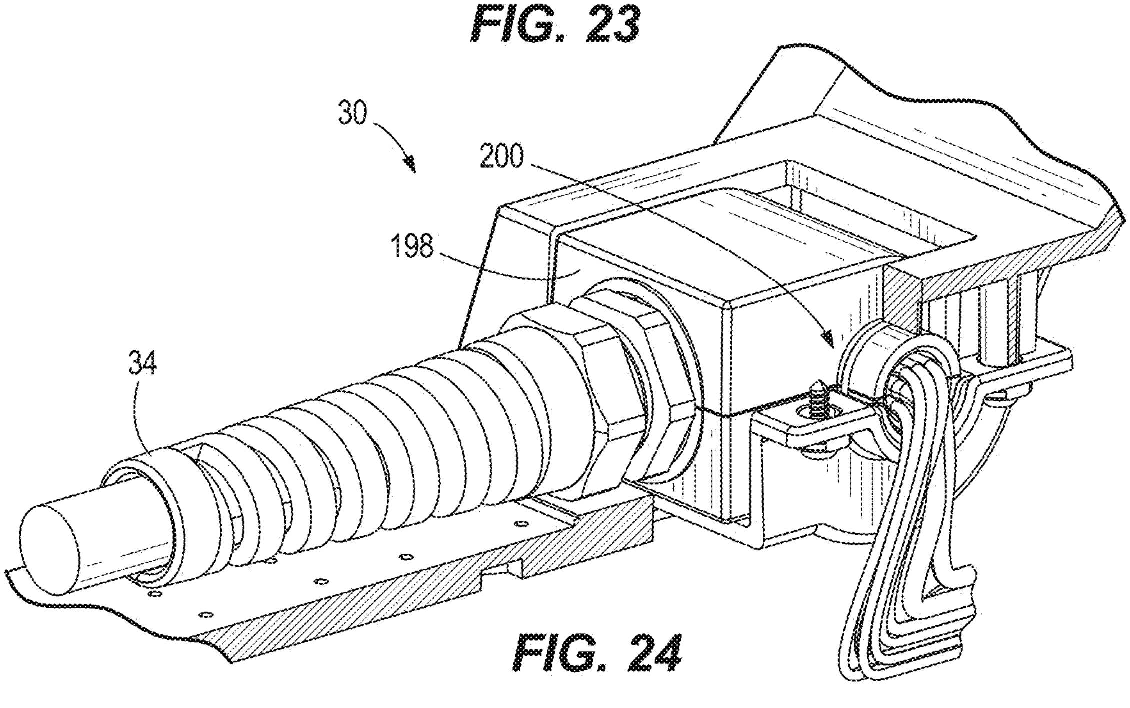
FIG. 24 is a perspective view of the adapter of FIG. 15, taken generally along the line 24-24 of FIG. 15.

With reference to FIGS. 23-24, the adapter 30 includes a pivot joint 198 that pivotally connects the adapter cord 34 to the adapter 30. The pivot joint 198 pivots about a pivot axis 202 between a substantially vertical orientation (e.g., about 80° to about 100°) and a substantially horizontal orientation (e.g., about −10° to about 10°), as illustrated in FIG. 23. The pivot joint 198 includes a captured rotation feature 200. The captured rotation feature 200 prevents wear on the adapter cord 34 and better maneuverability for the adaptor 30. That is, the captured rotation feature 200 if allows the adapter cord 34 to rotate within one or both of the housing or the pivot joint relative to the housing 46. Accordingly, as the user moves the power tool 10, and therefore the adapter 20 around, there is less kinking and bending of the adapter cord 34 within the housing 46 because it can move (e.g., rotate) therein.

FIGS. 25-36 illustrate battery packs 14, 14' operable with and connectable to the electrical device (e.g., the tool 10), the adapter assembly 18 and the charger 38. The illustrated battery packs 14, 14' have a mechanical and electrical interface comparable to the adapter assembly (e.g., the rails 98 and the grooves 194, the terminal assembly including the terminals 182, etc.). In a manner similar to the adapter 30, the illustrated battery pack 14, 14' is thus also connectable (e.g., mechanically and/or electrically) to the adapter assembly 18 to be supported by the adapter assembly 18 when not in use (e.g., for storage, charging, etc.).

The battery packs 14, 14' and interfaces may be similar to the battery packs and interfaces described and illustrated in U.S. patent application Ser. No. 15/845,063, filed Dec. 18, 2017, the entire contents of which is hereby incorporated by reference.

The battery pack 14, 14' includes a number of battery cells (not shown) having a nominal voltage (e.g., between about 3 volts (V) and about 5 V) and a nominal capacity (e.g., between about 3 Amp-hours (Ah) and about 5 Ah or more (e.g., up to about 9 Ah)). The battery cells may be any rechargeable battery cell chemistry type, such as, for example, lithium (Li), lithium-ion (Li-ion), other lithium-based chemistry, nickel-cadmium (NiCd), nickel-metal hydride (NiMH), etc.

The battery pack 14, 14' may be any type of battery pack (e.g., battery packs that include a single cell string (1P), two parallel cell strings (2P), three parallel cell strings (3P). In one construction (see FIGS. 25-30), the battery pack 14 includes a single string of 20 series-connected cells (20S1P). In another construction (see FIGS. 31-36), the battery pack 14' includes two parallel strings of 20 series-connected cells (20S2P).

In the illustrated construction, the adapter assembly 18 has dimensions comparable to the battery packs 14 or 14'. The illustrated adapter assembly 18 has a length (e.g., the housing 48, not including the handle 62) of about 300 mm to about 325 mm (e.g., 315 mm; 378 mm with the handle 62)), a width (not including the cord wrap(s) 102) of about 155 mm to about 175 mm (e.g., 168 mm; 222.75 mm with the cord wraps 102) and a height (not including the feet 106) of about 110 mm to about 130 mm (e.g., 122 mm; 152 mm with the feet 106). In comparison, the illustrated battery pack 14' has a length of about 272.2 mm, a width of about 181 mm, and a height of about 105.2 mm (the battery pack 14 has a similar length and height).

A method of operating an adapter assembly 18 is also provided. The method may generally include winding the adapter cord 34 about one of the cord wraps 102 and coupling the engagement portion 178 to the storage portion 74. Moreover, the method may also include winding the power cord 26 around the other cord wrap 102.

One or more independent features and/or independent advantages of the invention may be set forth in the claims.

What is claimed is:

1. A power box for use with an adapter assembly, the power box comprising:

a housing containing internal components configured to receive an alternating current and to output a direct current, wherein the housing includes a storage portion configured to receive an adapter, the storage portion defining a recessed cavity that has an open end proximate the first end of the housing, a closed end opposite the open end, a pair of rails extending longitudinally along opposite sides of the recessed cavity, and a pair of grooves extending longitudinally along opposite sides of the recessed cavity; and a foot projecting from the housing and having a first height;

wherein the housing is spaced apart from a support surface by the first height.

2. The power box of claim 1, wherein the foot is one of a plurality of feet projecting from the housing, each of the plurality of feet having the first height.

3. The power box of claim 2, wherein the plurality of feet includes a first elongate foot extending along one side of the housing and a second elongate foot extending along a second side of the housing.

4. The power box of claim 2, wherein one of the plurality of feet is positioned proximate each of four corners of the housing.

5. The power box of claim 1, wherein the housing includes an intake opening and an exhaust opening, the intake opening and the exhaust opening being positioned on opposite sides of the housing.

6. The power box of claim 5, wherein the intake opening is spaced apart from the support surface by a second height, and the exhaust opening is spaced apart from the support surface by a third height that is different than the second height.

7. The power box of claim 1, wherein the housing has a first cord wrap configured to receive a first wound cord and a second cord wrap configured to receive a second wound cord, the first cord wrap and the second cord wrap being positioned on opposite sides of the housing.

8. A power box for use with an adapter assembly, the power box comprising:

a housing defining a top side, a bottom side opposite the top side, a first end, and a second end opposite the first end, the housing containing internal components configured to receive an alternating current and to output a direct current, wherein the housing includes a storage portion configured to receive an adapter, the storage portion defining a recessed cavity that has an open end proximate the first end of the housing, a closed end opposite the open end, a pair of rails extending longitudinally along opposite sides of the recessed cavity, and a pair of grooves extending longitudinally along opposite sides of the recessed cavity; and a foot projecting from the bottom side of the housing and extending longitudinally between the first end to the second end, the foot configured to support the housing atop a support surface;

wherein the foot spaces the bottom side from the support surface by a first height.

9. The power box of claim 8, wherein the housing further defines a first lateral side opposite a second lateral side, and wherein the foot is a first foot located at the first lateral side, and wherein the power box further includes a second foot located at the second lateral side and projecting from the bottom side, the second foot extending longitudinally between the first end to the second end.

10. The power box of claim 8, further including a cord wrap.

11. The power box of claim 10, wherein the housing further defines opposite lateral sides, and wherein the cord wrap includes a first cord wrap and a second cord wrap located at the opposite lateral sides.

12. The power box of claim 8, wherein the housing includes an intake opening located at the first end and an exhaust opening located at the second end, and wherein the housing defines an airflow path that extends from the intake opening to the exhaust opening.

13. The power box of claim 8, further including a power inlet located at the first end and configured to electrically connect the power box to a source of the alternating current.

14. A power box for use with an adapter assembly, the power box comprising:

internal components configured to receive an alternating current and to output a direct current; and a housing containing the internal components, the housing including:

a top side, a bottom side opposite the top side, a first end, a second end opposite the first end, and opposite lateral sides, a cord wrap located at one of the lateral sides, and a storage portion located in the top side, the storage portion configured to receive an adapter of the adapter assembly, the storage portion defining a recessed cavity that has an open end proximate the first end of the housing, a closed end opposite the open end, a pair of rails extending longitudinally along opposite sides of the recessed cavity, and a pair of grooves extending longitudinally along opposite sides of the recessed cavity, and an intake opening located at the first end and an exhaust opening located at the second end, wherein the housing defines an airflow path that extends from the intake opening to the exhaust opening.

15. The power box of claim 14, further including a power inlet located at the first end and configured to electrically connect the power box to a source of the alternating current.

16. The power box of claim 15, further including a handle protruding from the first end.

17. The power box of claim 14, further including a foot projecting from the bottom side of the housing and extending longitudinally from the first end to the second end, the foot configured to support the housing atop a support surface and space the bottom side apart from the support surface by a first height.

18. The power box of claim 17, wherein the foot is a first foot located at one of the lateral sides, and wherein the power box further includes a second foot located at another of the lateral sides and projecting from the bottom side, the second foot extending longitudinally between the first end to the second end.

* * * * *